United States Patent
Kurashige et al.

(10) Patent No.: US 9,712,024 B2
(45) Date of Patent: Jul. 18, 2017

(54) COIL END SHAPING APPARATUS AND METHOD

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Daichi Kurashige, Nishio (JP); Shingo Hashimoto, Okazaki (JP); Hiroyuki Tanaka, Anjo (JP); Takanori Ota, Anjo (JP); Osamu Nakagawa, Anjo (JP); Daisuke Matsuo, Anjo (JP); Hirotaka Kawaura, Toyota (JP); Hiroharu Sugiura, Toyota (JP); Norihiko Akao, Nissin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 14/408,258

(22) PCT Filed: Mar. 27, 2013

(86) PCT No.: PCT/JP2013/058949
§ 371 (c)(1),
(2) Date: Dec. 15, 2014

(87) PCT Pub. No.: WO2014/017125
PCT Pub. Date: Jan. 30, 2014

(65) Prior Publication Data
US 2015/0171716 A1  Jun. 18, 2015

(30) Foreign Application Priority Data

Jul. 25, 2012  (JP) ................................ 2012-165034

(51) Int. Cl.
*H02K 15/00* (2006.01)
*B21F 1/00* (2006.01)
(Continued)

(52) U.S. Cl.
CPC ......... *H02K 15/0081* (2013.01); *B21F 1/004* (2013.01); *B21D 7/06* (2013.01);
(Continued)

(58) Field of Classification Search
CPC ......... Y10T 29/49009; Y10T 29/53161; B21F 1/00; B21F 1/004; B21F 1/006;
(Continued)

(56) References Cited

U.S. PATENT DOCUMENTS

2007/0022596 A1  2/2007  Nishimura et al.
2008/0093948 A1  4/2008  Naganawa

FOREIGN PATENT DOCUMENTS

JP  2002-064028 A  2/2002
JP  A-2003-134818  5/2003
(Continued)

OTHER PUBLICATIONS

Machine translation of description section of JP 2002-064028 provided by JPO website (J-PlatPat).*
(Continued)

*Primary Examiner* — Peter DungBa Vo
*Assistant Examiner* — Joshua D Anderson
(74) *Attorney, Agent, or Firm* — Oliff PLC

(57) ABSTRACT

A coil end shaping apparatus shapes a plurality of edgewise bent portions that are bent in the edgewise direction in a lead wire portion extending from one end of a coil, and includes first and second shaping dies capable of approaching each other to shape the edgewise bent portions provided on the base end side with respect to the edgewise bent portion e4 that is the closest to the free end side among the plurality of
(Continued)

edgewise bent portions, and a third shaping die capable of cooperating with the second shaping die to shape the edgewise bent portion that is the closest to the free end side.

18 Claims, 19 Drawing Sheets

(51) Int. Cl.
    *B21D 7/06*     (2006.01)
    *B21D 11/10*     (2006.01)
    *H02K 3/18*     (2006.01)

(52) U.S. Cl.
    CPC ............... *B21D 11/10* (2013.01); *B21F 1/008* (2013.01); *H02K 3/18* (2013.01)

(58) Field of Classification Search
    CPC .. B21F 1/008; B21F 1/04; B21F 35/02; B21F 35/04; B21F 99/00; B21D 7/06; B21D 11/10; B21D 13/02; H02K 3/18; H02K 15/0068; H02K 15/0081
    USPC ......... 72/306, 308, 309, 316, 374, 375, 381, 72/385, 394, 399–401, 404, 470, 471, 72/474, 475; 29/596, 736
    See application file for complete search history.

(56) References Cited

FOREIGN PATENT DOCUMENTS

| JP | A-2003-143818 | 5/2003 |
|----|---------------|--------|
| JP | A-2003-264964 | 9/2003 |
| JP | A-2004-297863 | 10/2004 |
| JP | 2007-250801 A | 9/2007 |
| JP | A-2008-104293 | 5/2008 |
| JP | A-2010-110122 | 5/2010 |
| JP | 2011-050215 A | 3/2011 |
| JP | A-2011-151996 | 8/2011 |

OTHER PUBLICATIONS

Machine translation of description section of JP 2011-050215 provided by EPO website (Espacenet).*
International Search Report issued in International Patent Application No. PCT/JP2013/058949 dated Jun. 18, 2013.
May 19, 2016 Extended Search Report issued in European Patent Application No. 13822810.1.

* cited by examiner

COIL END SHAPING APPARATUS AND METHOD

TECHNICAL FIELD

Exemplary disclosed embodiments relate to a coil end shaping apparatus and a coil end shaping method that shape a plurality of edgewise bent portions that are bent in the edgewise direction in a lead wire portion extending from one end of a coil.

BACKGROUND ART

Hitherto, there has been known a coil that constitutes a stator of a rotary electric machine, the coil being formed by winding a wire material (rectangular wire) with a rectangular cross section and having a crossover wire (lead wire portion) provided at one end (see Patent Document 1, for example). The coil is mounted to a stator core via an insulating member, and an end portion of the crossover wire is electrically connected to an end portion of another corresponding coil on the side opposite to a crossover wire. There is also known a coil for a rotary electric machine, the coil being formed by inserting a segment, which is a generally U-shaped conductor, into a slot formed in a stator core or a rotor core, and sequentially joining, such as welding, end portions of segments to each other on one end side of the core (see Patent Document 2, for example). The coil is formed by bending a rectangular wire in the flatwise direction (direction generally orthogonal to the long side of the cross section) and the edgewise direction (direction generally orthogonal to the short side of the cross section) using a plurality of dies, rollers, etc.

RELATED-ART DOCUMENTS

Patent Documents

[Patent Document 1] Japanese Patent Application Publication No. 2010-110122 (JP 2010-110122 A)
[Patent Document 2] Japanese Patent Application Publication No. 2004-297863 (JP 2004-297863 A)

SUMMARY

Also in the rotary electric machine described in Patent Document 1 mentioned above, it is preferable to bend the lead wire portion in the flatwise direction and the edgewise direction a plurality of times in order to achieve a size reduction of the rotary electric machine while suppressing interference between lead wire portions (crossover wires). If a plurality of edgewise bent portions that are bent in the edgewise direction are collectively shaped by a pair of shaping dies in the lead wire portion, however, the wire material is expanded by a greater amount in an edgewise bent portion on the base end side than in an edgewise bent portion on the free end side, which may cause an increase in dimensional error of the lead wire portion and an increase in electric resistance of the edgewise bent portion on the base end side.

It is therefore an object of exemplary embodiments to precisely shape a plurality of edgewise bent portions that are bent in the edgewise direction in a lead wire portion extending from one end of a coil.

In order to achieve the foregoing main object, the coil end shaping apparatus and the coil end shaping method according to exemplary embodiments adopt the following means.

The exemplary embodiments provide a coil end shaping apparatus that shapes a plurality of edgewise bent portions that are bent in an edgewise direction in a lead wire portion extending from one end of a coil, characterized by including first and second shaping dies capable of approaching each other to shape at least some of the plurality of edgewise bent portions provided on a base end side with respect to one of the edgewise bent portions that is the closest to a free end side and a third shaping die capable of cooperating with one of the first and second shaping dies to shape at least the edgewise bent portion that is the closest to the free end side.

The coil end shaping apparatus is configured to shape at least some of the plurality of edgewise bent portions provided on the base end side with respect to one of the edgewise bent portions that is the closest to the free end side by moving the first and second shaping dies to approach each other, and to shape at least the edgewise bent portion that is the closest to the free end side using one of the first and second shaping dies and the third shaping die. Thus, it is possible to shape at least some of the edgewise bent portions provided on the base end side with respect to one of the edgewise bent portions that is the closest to the free end side without restraining the free end portion of the lead wire portion using the first and second shaping dies, and to thereafter shape the edgewise bent portion that is the closest to the free end side using one of the first and second shaping dies and the third shaping die. As a result, it is possible to suppress an increase in dimensional error and electric resistance by optimizing the amount of expansion of the edgewise bent portions on the base end side of the lead wire portion, and to improve the precision in position of the free end portion of the lead wire portion with respect to the coil. Thus, according to the coil end shaping apparatus, it is possible to precisely shape the plurality of edgewise bent portions which are bent in the edgewise direction in the lead wire portion extending from one end of the coil.

The coil end shaping apparatus may further include a coil support portion capable of supporting the coil and turning so as to shape the one of the plurality of edgewise bent portions that is the closest to the base end side. Thus, the edgewise bent portion that is the closest to the base end side can be shaped by turning the coil with the free end side of the lead wire portion held (restrained) by at least the first and second shaping dies. Thus, it is possible to shape the edgewise bent portion that is the closest to the base end side while securing the precision in position of the free end portion of the lead wire portion with respect to the coil.

The coil end shaping apparatus may be capable of shaping at least one flatwise bent portion that is bent in a flatwise direction in the lead wire portion. Thus, it is possible to shorten the time required to shape the plurality of edgewise bent portions and the at least one flatwise bent portion in the lead wire portion.

The coil end shaping apparatus may be capable of shaping a plurality of flatwise bent portions in the lead wire portion sequentially from the base end side toward the free end side of the lead wire portion. Thus, it is possible to shape the plurality of flatwise bent portions in the lead wire portion while suppressing an increase in amount by which the wire material is expanded in the flatwise bent portion on the base end side of the lead wire portion.

The first and second shaping dies may be capable of cooperating with each other to shape the at least one flatwise bent portion. Thus, the plurality of edgewise bent portions and the at least one flatwise bent portion can be shaped in the lead wire portion by moving the first and second shaping dies to approach each other. Thus, it is possible to further shorten the time required to shape the edgewise bent portions and the flatwise bent portion in the lead wire portion.

One of the first and second shaping dies may be a movable die that is movable with respect to the other, and may have a plurality of pressing surfaces that press the lead wire portion against the other of the first and second shaping dies to shape the flatwise bent portion, and a pushing surface formed between the plurality of pressing surfaces; and an inclination angle of the pushing surface with respect to a moving direction of the one of the first and second shaping dies may be steeper than an inclination angle of the pressing surfaces with respect to the moving direction. In this way, it is possible to reduce the interval of shaping of the plurality of flatwise bent portions and to achieve a size reduction of the movable die in the moving direction by steepening the angle of the pushing surface provided between the pressing surfaces which shape the flatwise bent portion with respect to the moving direction.

The coil end shaping apparatus may further include a fourth shaping die capable of cooperating with one of the first and second shaping dies to shape the at least one flatwise bent portion. Also according to such a coil end shaping apparatus, it is possible to precisely shape the plurality of edgewise bent portions and the at least one flatwise bent portion in the lead wire portion extending from one end of the coil.

The coil end shaping apparatus may further include a pushing mechanism that pushes the lead wire portion when one of the first and second shaping dies is moved away from the other, the pushing mechanism pushing the lead wire portion against the other of the first and second shaping dies so as not to move to follow movement of the one of the first and second shaping dies. Thus, it is possible to favorably suppress deformation of the lead wire portion due to being dragged by one of the first and second shaping dies being moved when one of the first and second shaping dies is moved away from the other after shaping of the lead wire portion is completed.

The pushing mechanism may include a pushing member capable of abutting with the lead wire portion, and may move the pushing member so as to abut with a free end portion of the lead wire portion when the edgewise bent portion that is the closest to the free end side is shaped as one of the first and second shaping dies is moved toward the other, restrain movement of the pushing member until the one of the first and second shaping dies is moved away from the other by a predetermined amount after the edgewise bent portion that is the closest to the free end side is shaped, and move the pushing member away from the free end portion of the lead wire portion as the one of the first and second shaping dies is further moved away from the other. Thus, the pushing member can be advanced and retracted so as not to hinder shaping of the lead wire portion performed by the first to third shaping dies in accordance with movement of one of the first and second shaping dies toward and away from the other. In addition, movement of the pushing member is restrained until one of the first and second shaping dies is moved away from the other by the predetermined amount, which makes it possible to further favorably suppress deformation of the lead wire portion due to being dragged by one of the first and second shaping dies being moved.

The edgewise bent portion that is the closest to the free end side may be bent in a direction opposite to at least one of two edgewise bent portions that are the closest to and on the base end side with respect to the edgewise bent portion that is the closest to the free end side.

Exemplary embodiments also provide a coil end shaping method of shaping a plurality of edgewise bent portions that are bent in an edgewise direction in a lead wire portion extending from one end of a coil, including:

(a) a step of shaping at least some of the plurality of edgewise bent portions provided on a base end side with respect to one of the edgewise bent portions that is the closest to a free end side using first and second shaping dies; and (b) a step of shaping at least the edgewise bent portion that is the closest to the free end side using one of the first and second shaping dies and a third shaping die.

According to the coil end shaping method, it is possible to precisely shape the plurality of edgewise bent portions which are bent in the edgewise direction in the lead wire portion extending from one end of the coil.

The coil end shaping method may further include (c) a step of shaping one of the plurality of edgewise bent portions that is the closest to a base end side by turning the coil with at least the first and second shaping dies holding the lead wire portion, the step (c) being performed after the step (b).

The step (a) may include shaping at least one flatwise bent portion that is bent in a flatwise direction in the lead wire portion, and may include shaping a plurality of flatwise bent portions in the lead wire portion sequentially from the base end side toward the free end side of the lead wire portion.

The coil end shaping method may further include (d) a step of shaping at least one flatwise bent portion that is bent in a flatwise direction in the lead wire portion, the step (d) being performed before the step (a).

The coil end shaping method may further include (e) a step of moving one of the first and second shaping dies away from the other after shaping of the lead wire portion is completed, and the step (e) may include pushing the lead wire portion against the other of the first and second shaping dies so as not to move to follow movement of the one of the first and second shaping dies.

In the coil end shaping method, the edgewise bent portion that is the closest to the free end side may be bent in a direction opposite to at least one of two edgewise bent portions that are the closest to and on the base end side with respect to the edgewise bent portion that is the closest to the free end side.

DESCRIPTION

Now, an exemplary embodiment will be described with reference to the drawings.

Figure 1:
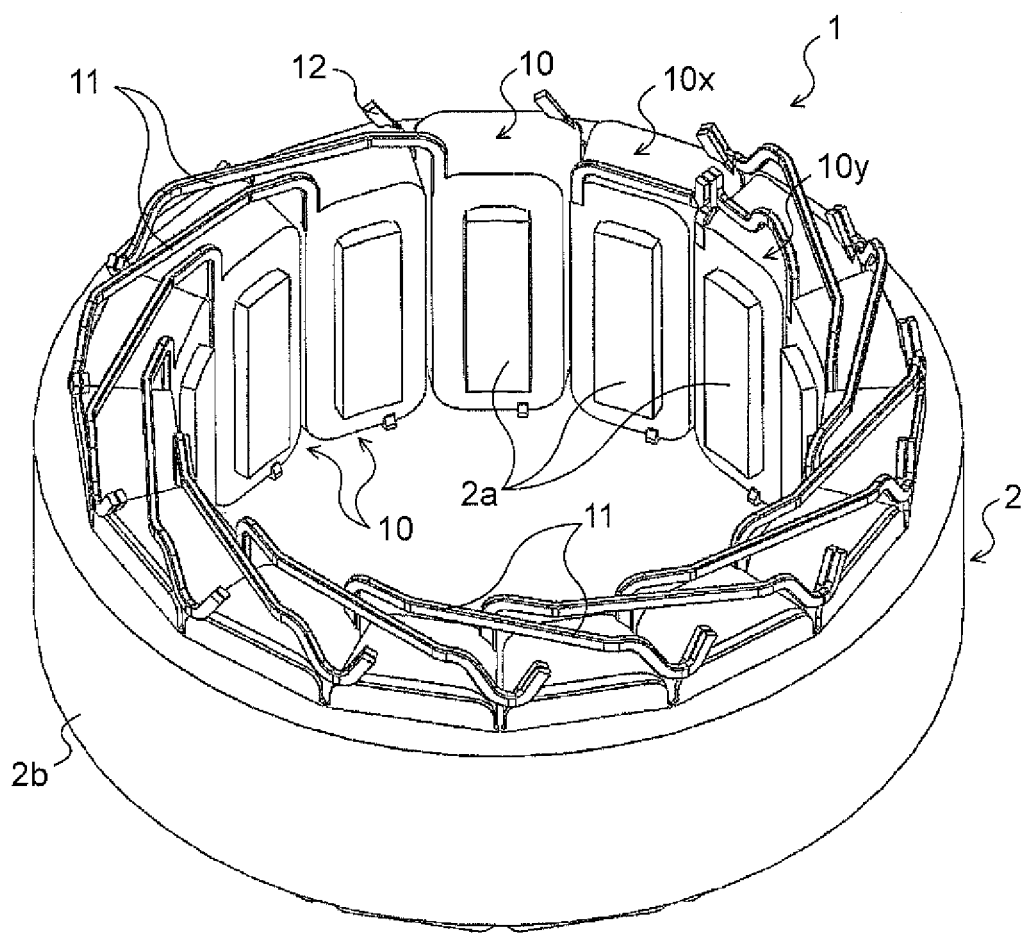
FIG. 1 is a perspective view illustrating an electric motor stator 1 including a coil 10 to which exemplary embodiments are applied.

FIG. 1 is a perspective view illustrating an electric motor stator 1 including a coil 10 of an exemplary embodiment. The electric motor stator 1 illustrated in the drawing constitutes a 3-phase AC electric motor used as a drive source or a generator for an electric vehicle or a hybrid vehicle, for example, together with a rotor (not illustrated), and includes a stator core 2 and a plurality of coils 10. The stator core 2 has a plurality of split cores 2a disposed in an annular arrangement, and a fixation ring 2b to which the plurality of split cores 2a are fixed. The coils 10 are mounted to the corresponding split cores 2a via an insulating member (not illustrated). Although not illustrated, the electric motor stator 1 (stator core 2) is coated with a molded resin such as a thermosetting resin or a thermoplastic resin on both sides in the axial direction.

Figure 2:
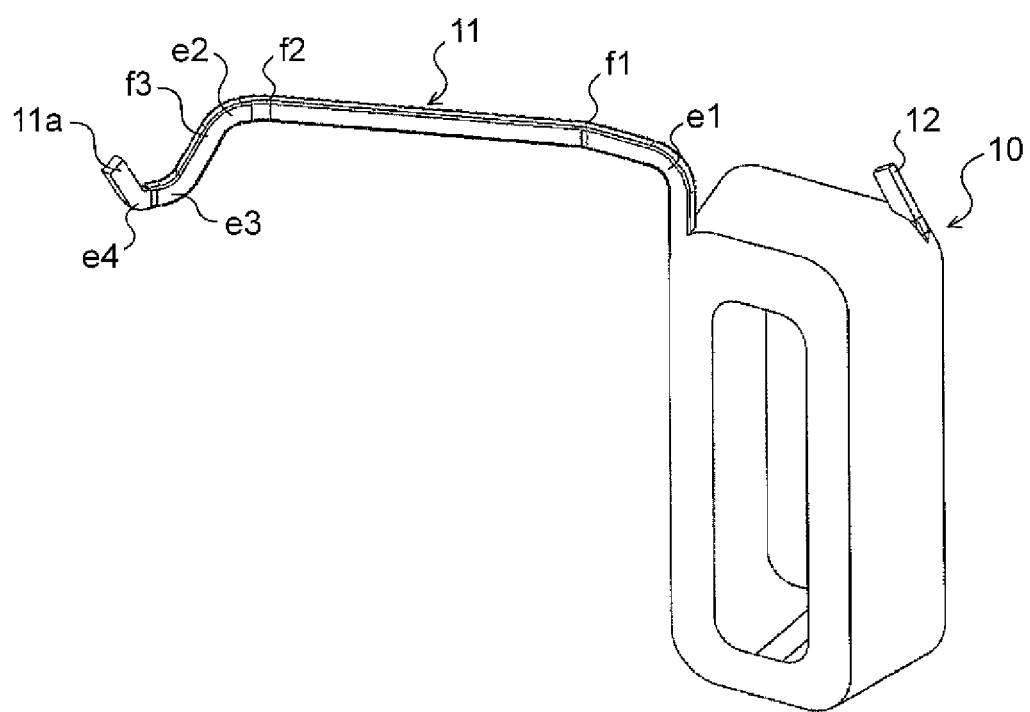
FIG. 2 is a perspective view illustrating the coil 10.

As illustrated in FIG. 2, the coil 10 is formed by winding a rectangular material with a rectangular cross section a plurality of times. A long-length lead wire portion (crossover wire) 11 extends from one end of the coil 10. A short-length connection end portion 12 extends from the other end of the coil 10. The lead wire portion 11 of each coil 10 has a plurality of edgewise bent portions e1, e2, e3, and e4 that are bent in the edgewise direction (direction generally orthogonal to the short side of the cross section), and a plurality of flatwise bent portions f1, f2, and f3 that are bent in the flatwise direction (direction generally orthogonal to the long side of the cross section). A free end portion 11a of the lead wire portion 11 of each coil 10 is electrically connected by welding to the corresponding connection end portion 12 of another coil 10. That is, the plurality of coils 10 are roughly divided into U-phase coils, V-phase coils, and W-phase coils, and each coil 10 is electrically connected to another coil 10 provided with two coils interposed therebetween. In the embodiment, as illustrated in FIG. 1, only two coils 10x and 10y have a lead wire portion shaped differently from that of the other coils 10. End portions of the lead wire portions of the coils 10x and 10y and the free end portion 11a of the lead wire portion 11 of the coil 10 provided adjacent to the coil 10y are electrically connected to each other to constitute a neutral point.

In the embodiment, the plurality of edgewise bent portions e1 to e4 and the plurality of flatwise bent portions f1 to f3 are formed such that the lead wire portion 11 extends upward in the axial direction of the stator core 2 from the outer peripheral side of the coil 10 to be bent at a right angle with respect to the axial direction, passes over other coils 10 (coil ends) at a side toward the center of the stator core 2, and extends downward once and then reverses such that the free end portion 11a extends upward. In addition, the edgewise bent portion e4 that is the closest to the free end side of the lead wire portion 11 is bent in the direction opposite to at least one (in the example of FIG. 2, the edgewise bent portion e2) of two edgewise bent portions e3 and e2 that are the closest to and on the base end side with respect to the edgewise bent portion e4 that is the closest to the free end side.

Figure 3:
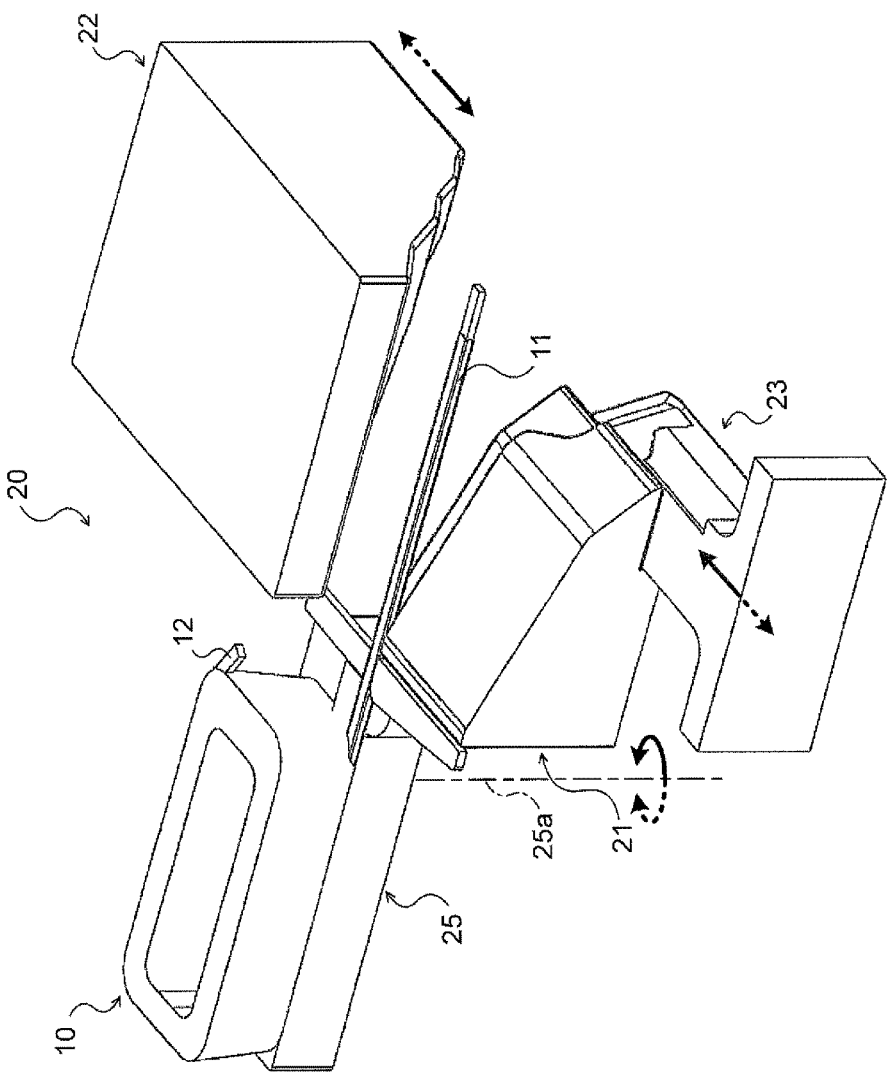
FIG. 3 is a perspective view illustrating a coil end shaping apparatus 20.
Figure 4:
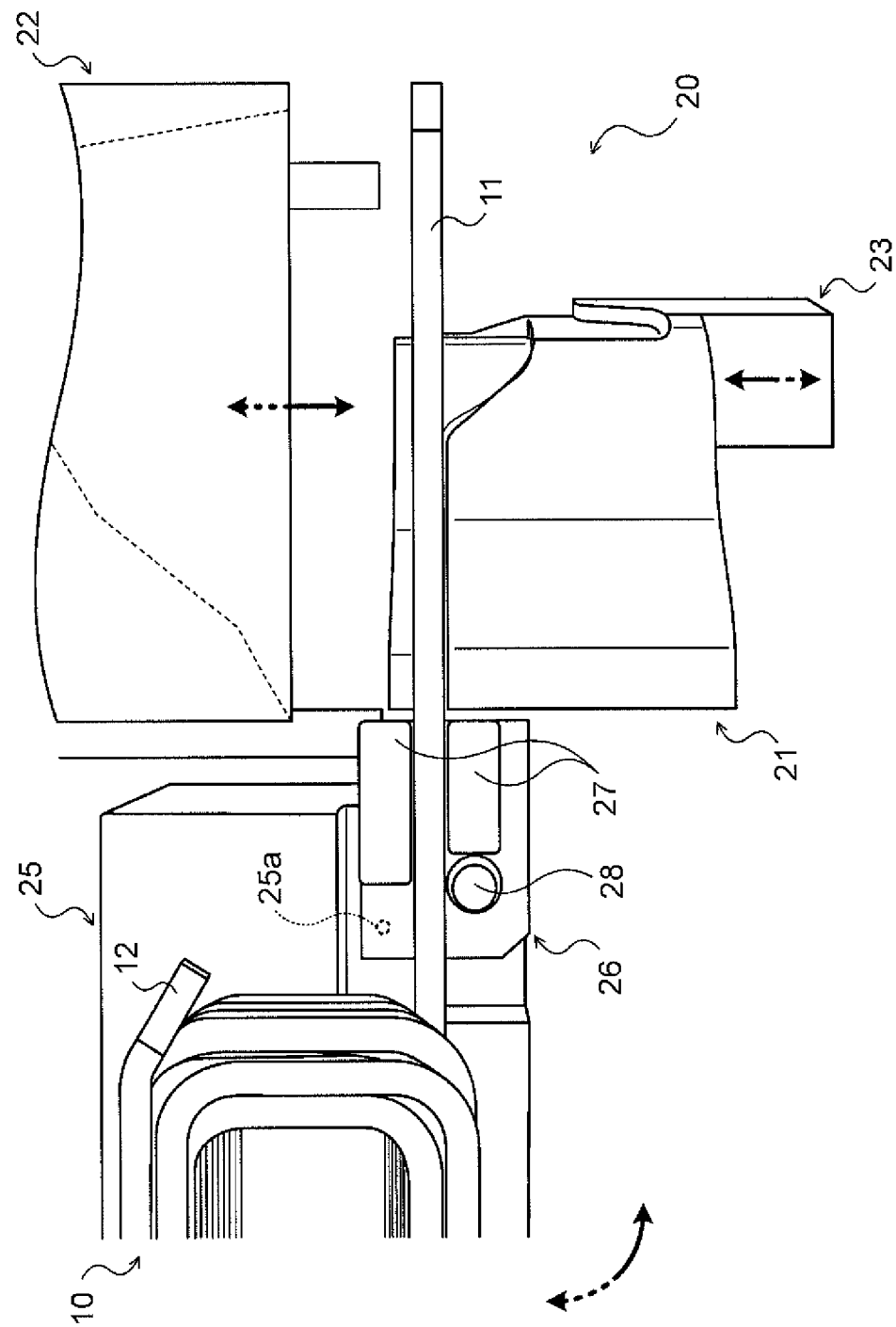
FIG. 4 is a perspective view illustrating the coil end shaping apparatus 20.

FIG. 3 is a perspective view illustrating the coil end shaping apparatus 20 used to shape the lead wire portion 11 of the coil 10. As illustrated in the drawing, the coil end shaping apparatus 20 includes a first shaping die 21, a second shaping die 22, and a third shaping die 23 configured to shape the plurality of edgewise bent portions e2 to e4 and the plurality of flatwise bent portions f1 to f3 in the lead wire portion 11 of the coil 10, and a coil support portion 25 that supports the coil 10. Further, as illustrated in FIG. 4, the coil end shaping apparatus 20 includes a bend guide portion 26 configured to shape the edgewise bent portion e1 that is the closest to the base end side in the lead wire portion 11.

Figure 5:
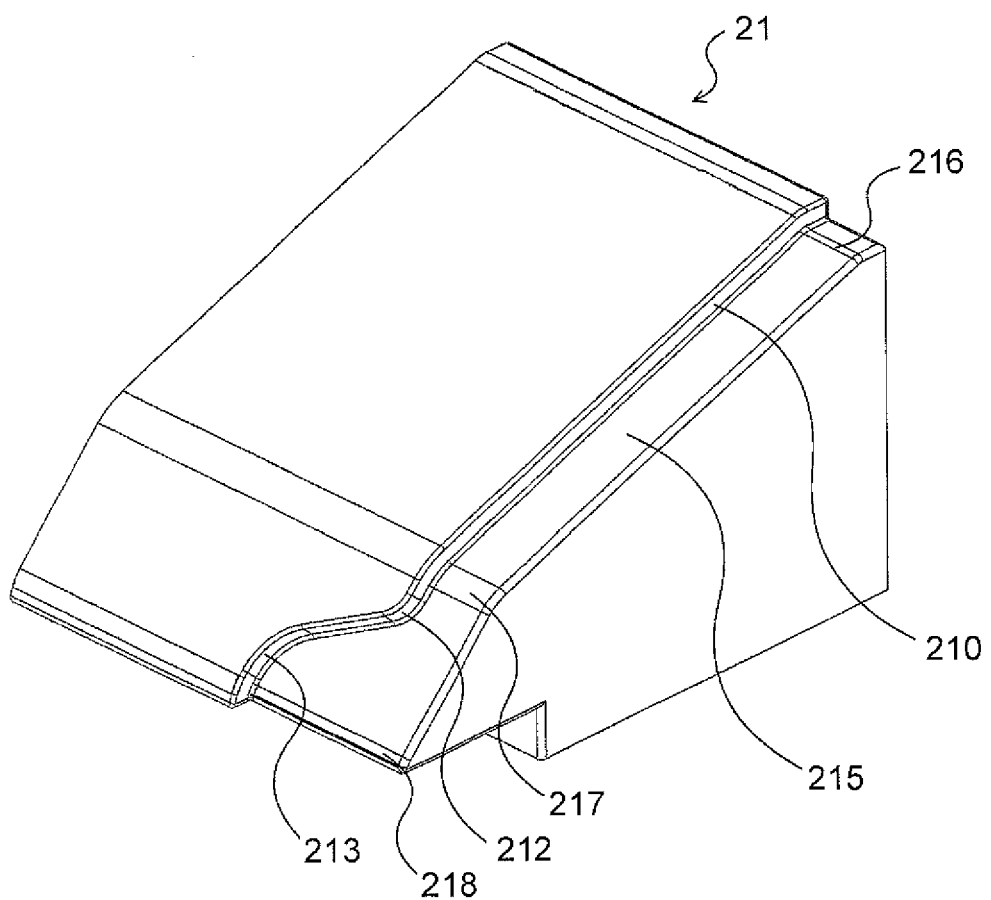
FIG. 5 is a perspective view illustrating a first shaping die 21.

The first shaping die 21 is a fixed die that is fixed with respect to the location of installation of the coil end shaping apparatus 20. As illustrated in FIG. 5, the first shaping die 21 has a first edgewise shaping surface 210 configured to shape the edgewise bent portions e2 and e3 in the lead wire portion 11 of the coil 10, and a first flatwise shaping surface 215 configured to shape the flatwise bent portions f1 to f3 in the lead wire portion 11. The first edgewise shaping surface 210 extends along the first flatwise shaping surface 215, and includes a curved surface 212 corresponding to the edgewise bent portion e2 and a curved surface 213 corresponding to the edgewise bent portion e3. In addition, the first flatwise shaping surface 215 includes a curved surface 216 corresponding to the flatwise bent portion f1, a curved surface 217 corresponding to the flatwise bent portion f2, and a curved surface 218 corresponding to the flatwise bent portion f3.

The second shaping die 22 is a movable die driven by a drive unit (not illustrated) including an electric motor, a hydraulic cylinder, or the like. The second shaping die 22 can be moved toward the first shaping die 21, which is a fixed die, in the direction indicated by the solid line in FIG.

3, and moved away from the first shaping die 21 in the direction indicated by the dotted line in FIG. 3. The second shaping die 22 has a second edgewise shaping surface 220 configured to shape the edgewise bent portions e2 and e3 in the lead wire portion 11 of the coil 10, and a second flatwise shaping surface 225 configured to shape the flatwise bent portions f1 to f3 in the lead wire portion 11. The second edgewise shaping surface 220 is formed to extend in parallel with the first edgewise shaping surface 210 of the first shaping die 21, and includes a curved surface 222 corresponding to the edgewise bent portion e2, a curved surface 223 corresponding to the edgewise bent portion e3, and a curved surface 224 corresponding to the edgewise bent portion e4.

The second flatwise shaping surface 225 is disposed in more proximity to the first shaping die 21 than the second edgewise shaping surface 220. The second flatwise shaping surface 225 includes a pressing surface 226 that presses the lead wire portion 11 against the first flatwise shaping surface 215 (curved surface 216) of the first shaping die 21 to shape the flatwise bent portion f1, a pressing surface 227 that presses the lead wire portion 11 against the first flatwise shaping surface 215 (curved surface 217) to shape the flatwise bent portion f2, a pressing surface 228 that presses the lead wire portion 11 against the first flatwise shaping surface 215 (curved surface 218) to shape the flatwise bent portion f3, a pushing surface 267 between the pressing surface 226 and the pressing surface 227, a pushing surface 278 between the pressing surface 227 and the pressing surface 228, and a pushing surface 280 that is continuous with the pressing surface 228. The pushing surfaces 267, 278, and 280 are intended to come into slide contact with the surface of the lead wire portion 11 to suppress a lift of the lead wire portion 11, and do not directly contribute to shaping of the flatwise bent portions f1 to f3.

Figure 6:
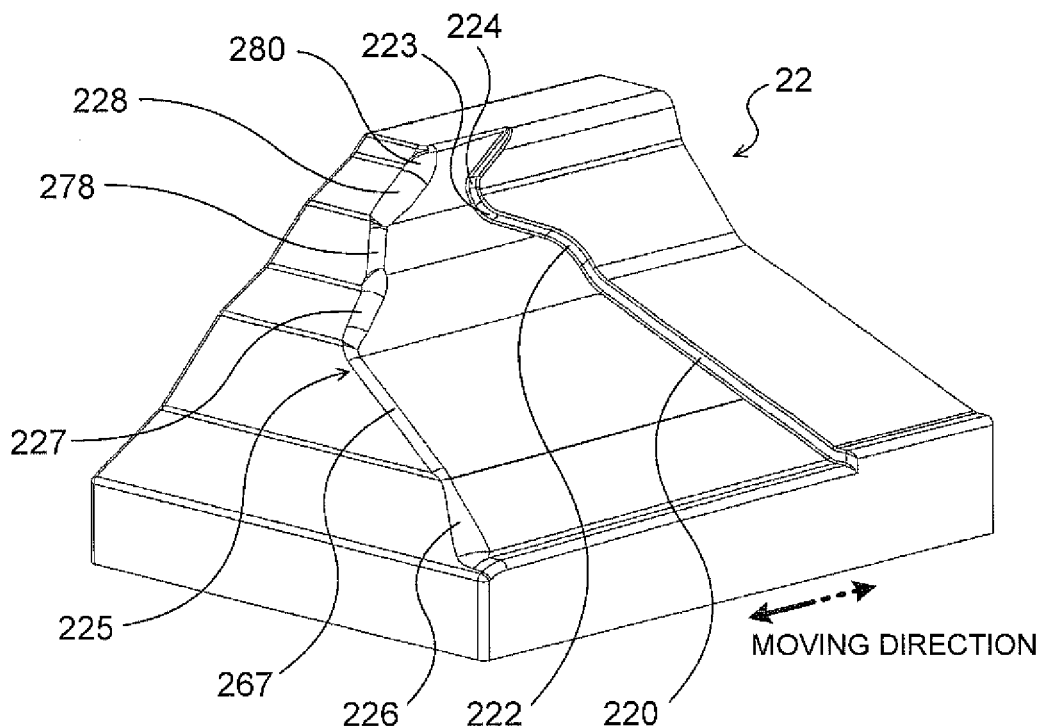
FIG. 6 is a perspective view illustrating a second shaping die 22.

In the embodiment, the second flatwise shaping surface 225 is formed such that the pressing surfaces 226, 227, and 228 sequentially press the lead wire portion 11 of the coil 10 when the second shaping die 22 is moved in the direction indicated by the solid line in FIG. 6 to approach the first shaping die 21. That is, the second flatwise shaping surface 225 extends obliquely downward with respect to the moving direction of the second shaping die 22 and in a zigzag manner away from the base end of the lead wire portion 11, starting from the lower surface of a corner portion of the second shaping die 22 that is the most proximate to the base end of the lead wire portion 11. In addition, the pressing surfaces 226 to 228 and the pushing surfaces 267, 278, and 280 are formed as curved surfaces that are curved from an edge portion on the first shaping die 21 side (the left edge portion in FIG. 6) to an edge portion on the second edgewise shaping surface 220 side.

Figure 7:
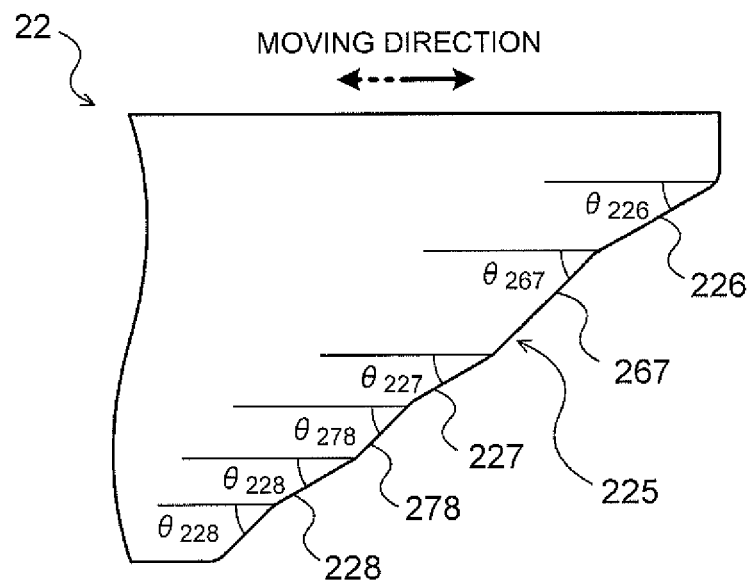
FIG. 7 is a schematic view illustrating the second shaping die 22.

As illustrated in FIG. 7, inclination angles $\theta_{267}$, $\theta_{278}$, and $\theta_{280}$ of the pushing surfaces 267, 278, and 280 with respect to the moving direction (a plane (vertical plane) extending in the moving direction) of the second shaping die 22, which is a movable die, are determined to be steeper than inclination angles $\theta_{226}$, $\theta_{227}$, and $\theta_{228}$ of the pressing surfaces 226 to 228 with respect to the moving direction (a plane (vertical plane) extending in the moving direction). That is, in the embodiment, the inclination angles $\theta_{267}$, $\theta_{278}$, and $\theta_{280}$ of the pushing surfaces 267, 278, and 280 are set to 45°, for example, and the inclination angles $\theta_{226}$, $\theta_{227}$, and $\theta_{228}$ of the pressing surfaces 226 to 228 are set to 30°, for example. Thus, it is possible to reduce the time over which the pushing surfaces 267, 278, and 280, which do not contribute to shaping of the flatwise bent portions f1 to f3, come into slide contact with a portion of the lead wire portion 11 between two flatwise bent portions or the like, that is, the interval of shaping of the plurality of flatwise bent portions f1 to f3, and to achieve a size reduction of the second shaping die 22 in the moving direction. A surface between the edge portion of the pressing surfaces 226 to 228 and the pushing surfaces 267, 278, and 280 and the edge portion of the second edgewise shaping surface 220 is preferably slightly inclined so that the second shaping die 22 can be smoothly moved away from the first shaping die 21 after shaping of the lead wire portion 11 is completed.

Figure 8:
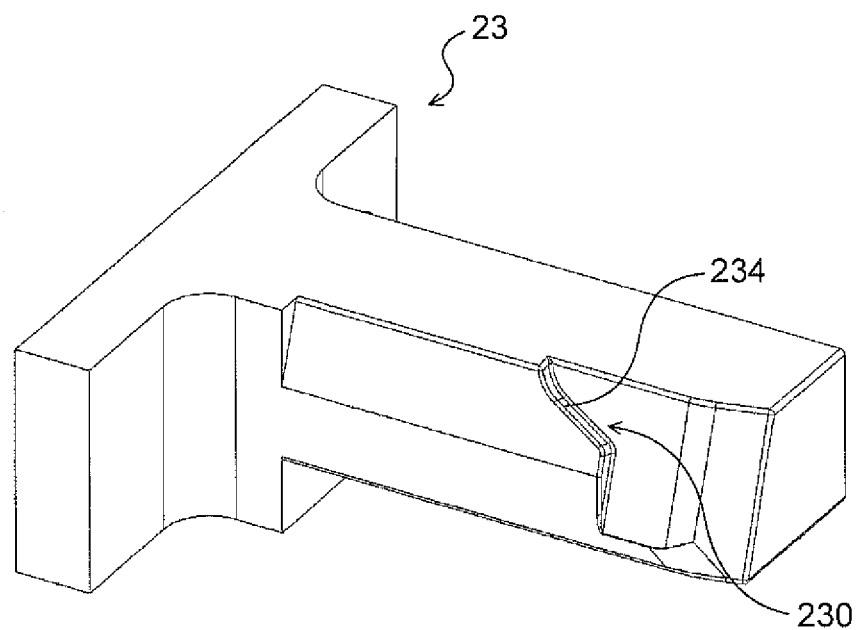
FIG. 8 is a perspective view illustrating a third shaping die 23.

The third shaping die 23 is a movable die that is movable in parallel with the moving direction of the second shaping die 22 with respect to the first shaping die 21, which is a fixed die. The third shaping die 23 is capable of cooperating with the second shaping die 22 to shape the edgewise bent portion e4 that is the closest to the free end side. That is, as illustrated in FIG. 8, the third shaping die 23 has a third edgewise shaping surface 230 including a curved surface 234 configured to shape the edgewise bent portion e4 that is the closest to the free end side in the lead wire portion 11 of the coil 10. In the embodiment, as illustrated in FIG. 3, the third shaping die 23 is disposed below the first shaping die 21, and driven by a drive unit (not illustrated) including an electric motor, a hydraulic cylinder, or the like to move toward and away from the second shaping die 22.

As illustrated in FIG. 3, the coil support portion 25 has a rotary shaft 25a extending in the flatwise direction (the up-down direction in FIG. 3, that is, a direction orthogonal to the moving direction of the second shaping die 22) of the lead wire portion 11 of the coil 10 supported by the coil support portion 25 to extend horizontally. The coil support portion 25 may be driven by a drive unit (not illustrated) to turn about the axis of the rotary shaft 25a. In the embodiment, the rotary shaft 25a of the coil support portion 25 is coupled to the drive unit for the third shaping die 23 via an interlocking mechanism (not illustrated) including a gear train, a link mechanism, or the like, for example. The coil support portion 25 is turned in the direction of the solid arrow in FIG. 3 (counterclockwise) as the third shaping die 23 is moved toward the second shaping die 22 in the direction indicated by the solid line in FIG. 3, and turned in the direction of the dotted arrow in FIG. 3 (clockwise) as the third shaping die 23 is moved away from the second shaping die 22 in the direction indicated by the dotted line in FIG. 3.

As illustrated in FIG. 4, the bend guide portion 26 has a pair of guide members 27 that guide the lead wire portion 11 of the coil 10 supported by the coil support portion 25 from both sides, and a bend fulcrum portion 28 that serves as the bend fulcrum for the edgewise bent portion e1 that is the closest to the base end side of the lead wire portion 11. In the embodiment, the bend fulcrum portion 28 has a columnar shape as illustrated in the drawing, and the axis of the bend fulcrum portion 28 is offset from the axis of the rotary shaft 25a of the coil support portion 25 such that the lead wire portion 11 does not move with respect to the coil support portion 25 and the bend guide portion 26 when the edgewise bent portion e1 is shaped. Thus, it is possible to suppress damage to the lead wire portion 11 due to being rubbed against the bend fulcrum portion 28 when the edgewise bent portion e1 is shaped. In the embodiment, the bend fulcrum portion 28 has a columnar shape as illustrated in the drawing, and is disposed such that the outer peripheral surface (columnar surface) of the bend fulcrum portion 28 contacts the lead wire portion 11 (side surface of the lead wire portion 11). The axis of the rotary shaft 25a of the coil support portion 25 is offset from the bend fulcrum portion 28 such that the lead wire portion 11 does not move with respect to the coil support portion 25 and the bend guide portion 26, that is, the lead wire portion 11 is not expanded with both the free end side of the lead wire portion 11 held (restrained) by the first and second shaping dies 21 and 22 and the base end side of the lead wire portion 11 supported by the coil support portion 25 restrained, when the coil support portion 25 is rotated to shape the edgewise bent portion e1. Thus, it is possible to prevent the lead wire portion 11 from being expanded to become thin when the edgewise bent portion e1 is shaped.

Next, a coil end shaping method according to an exemplary embodiment, that is, a procedure for shaping the lead wire portion 11 of the coil 10 using the coil end shaping apparatus 20 discussed above, will be described.

Before shaping the lead wire portion 11 using the coil end shaping apparatus 20, as illustrated in FIG. 3, the second shaping die 22 is moved away from the first shaping die 21, the third shaping die 23 is moved away from the second shaping die 22, and the coil support portion 25 is turned in the direction of the dotted arrow in FIG. 3. Further, as illustrated in FIG. 4, the coil 10 having the lead wire portion 11 extending straight is supported on the coil support portion 25, and the lead wire portion 11 is placed between the pair of guide members 27 of the bend guide portion 26. After the coil 10 is set on the coil support portion 25, the second shaping die 22 is moved by a drive unit (not illustrated) to approach the first shaping die 21 such that the gap between the first edgewise shaping surface 210 and the second edgewise shaping surface 220 coincides with the width of the lead wire portion 11.

Figure 9A:
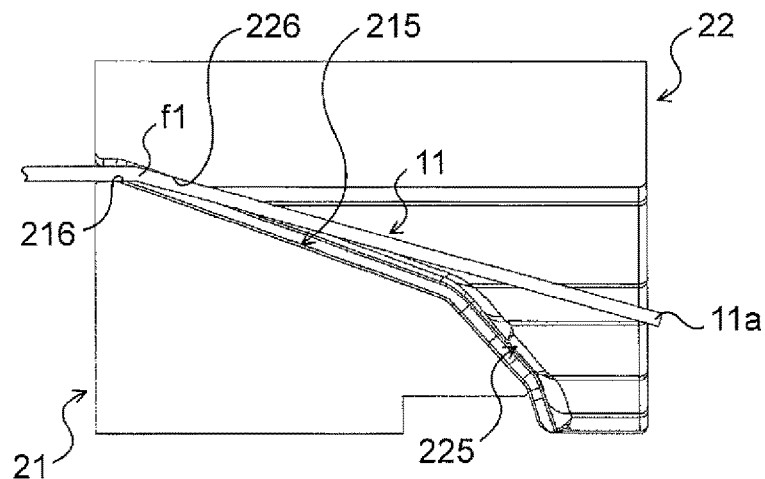
FIGS. 9A, 9B, and 9C are schematic views illustrating a procedure for shaping a lead wire portion 11 used by the coil end shaping apparatus 20.
Figure 9B:
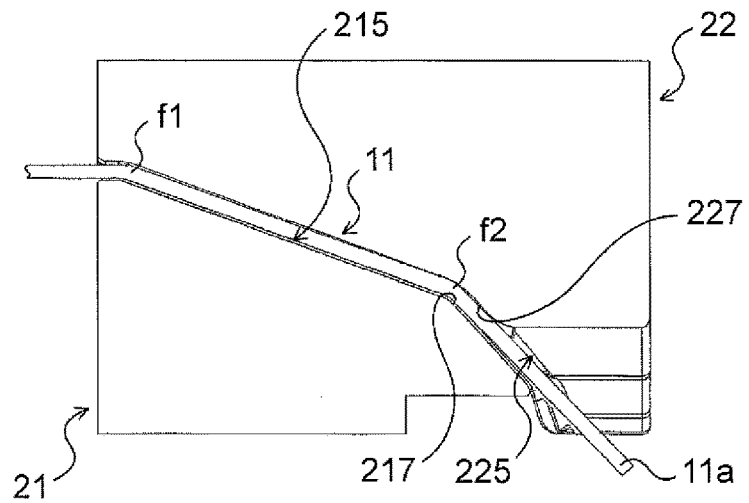
Figure 9C:
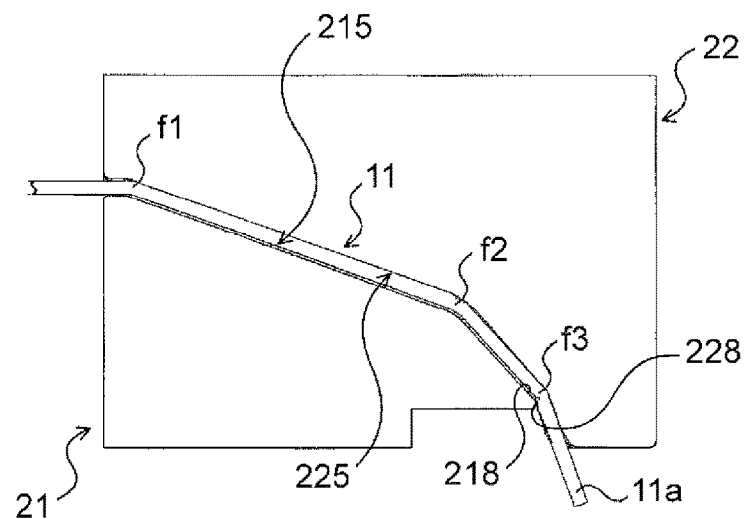

When the second shaping die 22 is moved to approach the first shaping die 21 in this way, the flatwise bent portion f1 that is the closest to the base end side of the lead wire portion 11 is first shaped by the curved surface 216 included in the first flatwise shaping surface 215 of the first shaping die 21 and the pressing surface 226 included in the second flatwise shaping surface 225 of the second shaping die 22 as illustrated in FIG. 9A. In addition, as the second shaping die 22 is further moved toward the first shaping die 21, the flatwise bent portion f2 of the lead wire portion 11 is shaped by the curved surface 217 included in the first flatwise shaping surface 215 of the first shaping die 21 and the pressing surface 227 included in the second flatwise shaping surface 225 of the second shaping die 22 as illustrated in FIG. 9B. Then, before movement of the second shaping die 22 is stopped with the gap between the first edgewise shaping surface 210 and the second edgewise shaping surface 220 generally coinciding with the width of the lead wire portion 11, the flatwise bent portion f3 that is the closest to the free end side of the lead wire portion 11 is shaped by the curved surface 218 included in the first flatwise shaping surface 215 of the first shaping die 21 and the pressing surface 228 included in the second flatwise shaping surface 225 of the second shaping die 22 as illustrated in FIG. 9C. In this way, in the coil end shaping apparatus 20, the plurality of flatwise bent portions f1, f2, and f3 are shaped sequentially from the base end side toward the free end side of the lead wire portion 11 in the lead wire portion 11 of the coil 10 by moving the first and second shaping dies 21 and 22 to approach each other. Thus, it is possible to shape the plurality of flatwise bent portions f1 to f3 in the lead wire portion 11 while suppressing an increase in amount by which the wire material is expanded in particular in the flatwise bent portion f1 on the base end side of the lead wire portion 11.

Figure 10:
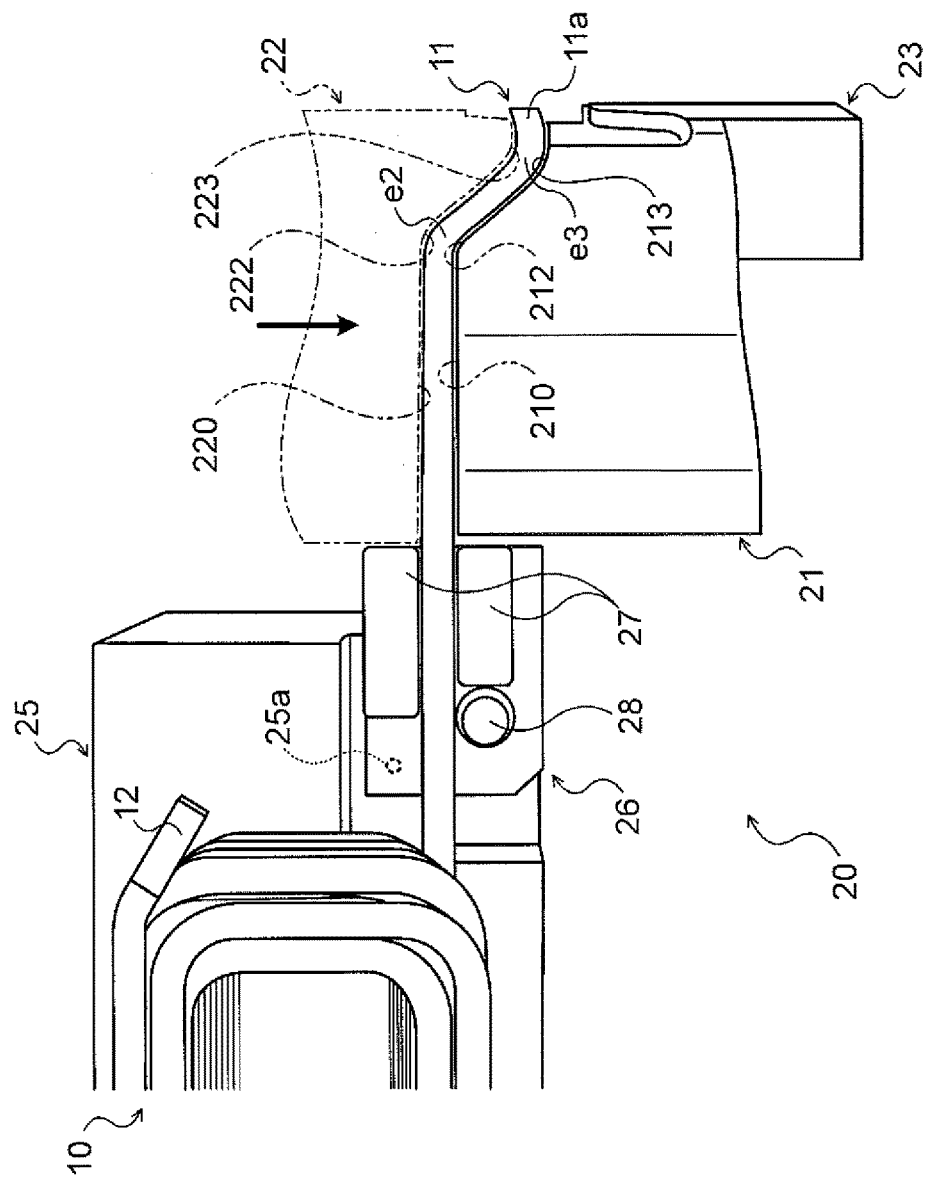
FIG. 10 is a perspective view illustrating the procedure for shaping the lead wire portion 11 used by the coil end shaping apparatus 20.

During a period since the start to the end of movement of the second shaping die 22 with respect to the first shaping die 21, the edgewise bent portions e2 and e3 provided on the base end side with respect to the edgewise bent portion e4 that is the closest to the free end side are shaped in the lead wire portion 11 as illustrated in FIG. 10. That is, when the first and second shaping dies 21 and 22 are moved to approach each other, the edgewise bent portion e2 is shaped by the curved surface 212 included in the first edgewise shaping surface 210 of the first shaping die 21 and the curved surface 222 included in the second edgewise shaping surface 220 of the second shaping die 22. Further, the edgewise bent portion e3 is shaped by the curved surface 213 included in the first edgewise shaping surface 210 and the curved surface 223 included in the second edgewise shaping surface 220.

Thus, it is possible to shape the edgewise bent portions e2 and e3 provided on the base end side with respect to the edgewise bent portion e4 that is the closest to the free end side, that is, positioned between the edgewise bent portion e1 that is the closest to the base end side and the edgewise bent portion e4 that is the closest to the free end side, without restraining the free end portion 11a of the lead wire portion 11 using the first and second shaping dies 21 and 22. Thus, according to the coil end shaping apparatus 20, it is possible to suppress an increase in amount by which the wire material is expanded in the edgewise bent portions e2 and e3, which tends to occur when the edgewise bent portions e2 and e3 are shaped with the free end portion 11a restrained, and to suppress an increase in dimensional error of the lead wire portion 11 and electric resistance at the edgewise bent portions e2 and e3.

Figure 11:
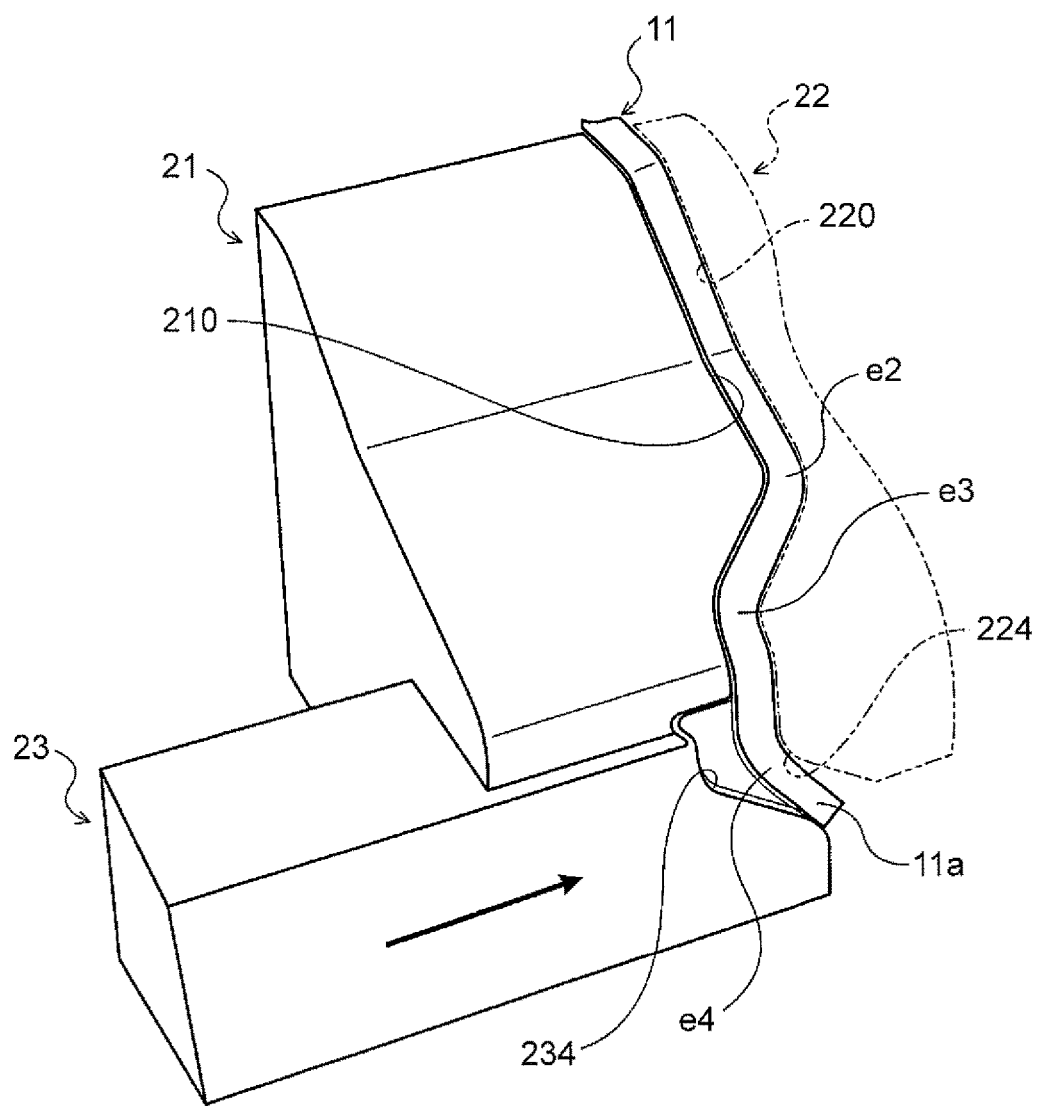
FIG. 11 is a perspective view illustrating the procedure for shaping the lead wire portion 11 used by the coil end shaping apparatus 20.

After movement of the second shaping die 22 with respect to the first shaping die 21 is stopped, the third shaping die 23 is moved by a drive unit (not illustrated) to approach the second shaping die 22 such that the gap between the second edgewise shaping surface 220 and the third edgewise shaping surface 230 coincides with the width of the lead wire portion 11 as illustrated in FIG. 11. Thus, the edgewise bent portion e4 that is the closest to the free end side is shaped by the curved surface 224 included in the second edgewise shaping surface 220 of the second shaping die 22 and the curved surface 234 included in the third edgewise shaping surface 230 of the third shaping die 23. In this way, the precision in position of the free end portion 11a of the lead wire portion 11, which serves as a portion for connection with the connection end portion 12 of another coil 10, with respect to the coil 10 can be improved by shaping the edgewise bent portion e4 that is the closest to the free end side after shaping the edgewise bent portions e2 and e3 provided on the base end side of the lead wire portion 11 without restraining the free end portion 11a of the lead wire portion 11.

Figure 12:
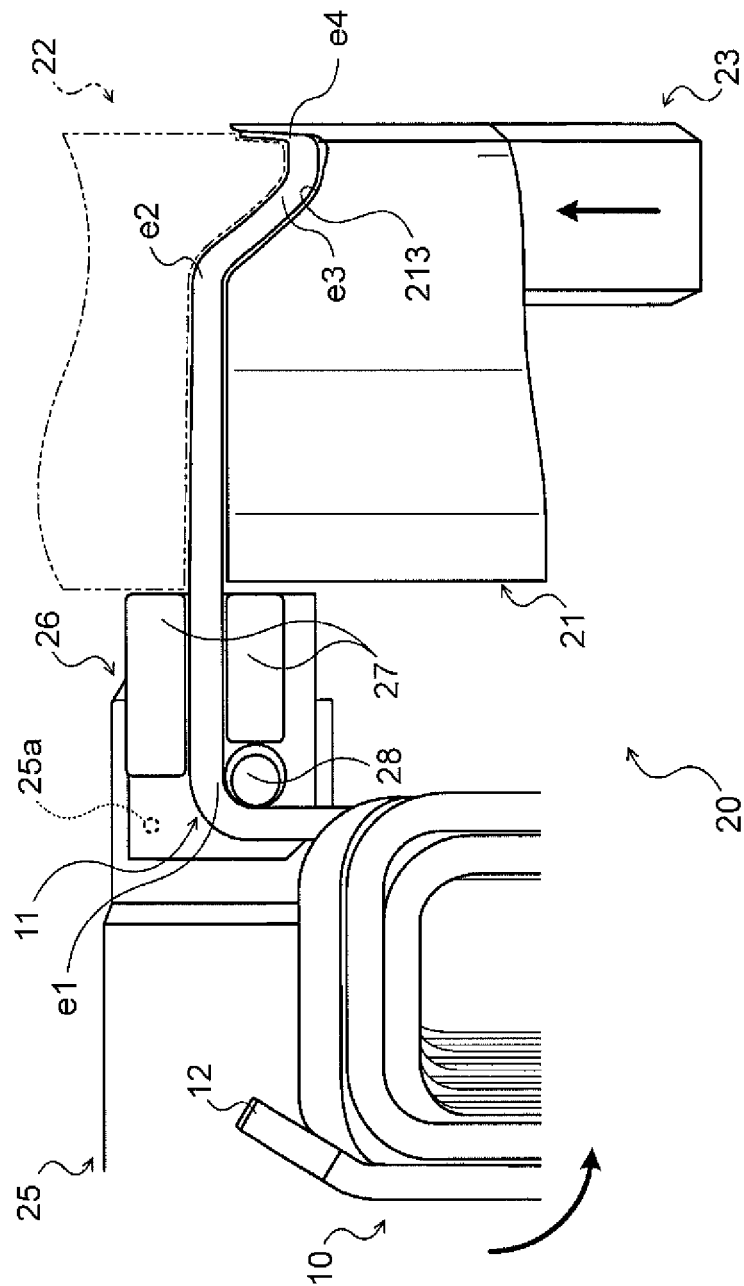
FIG. 12 is a perspective view illustrating the procedure for shaping the lead wire portion 11 used by the coil end shaping apparatus 20.
Figure 13:
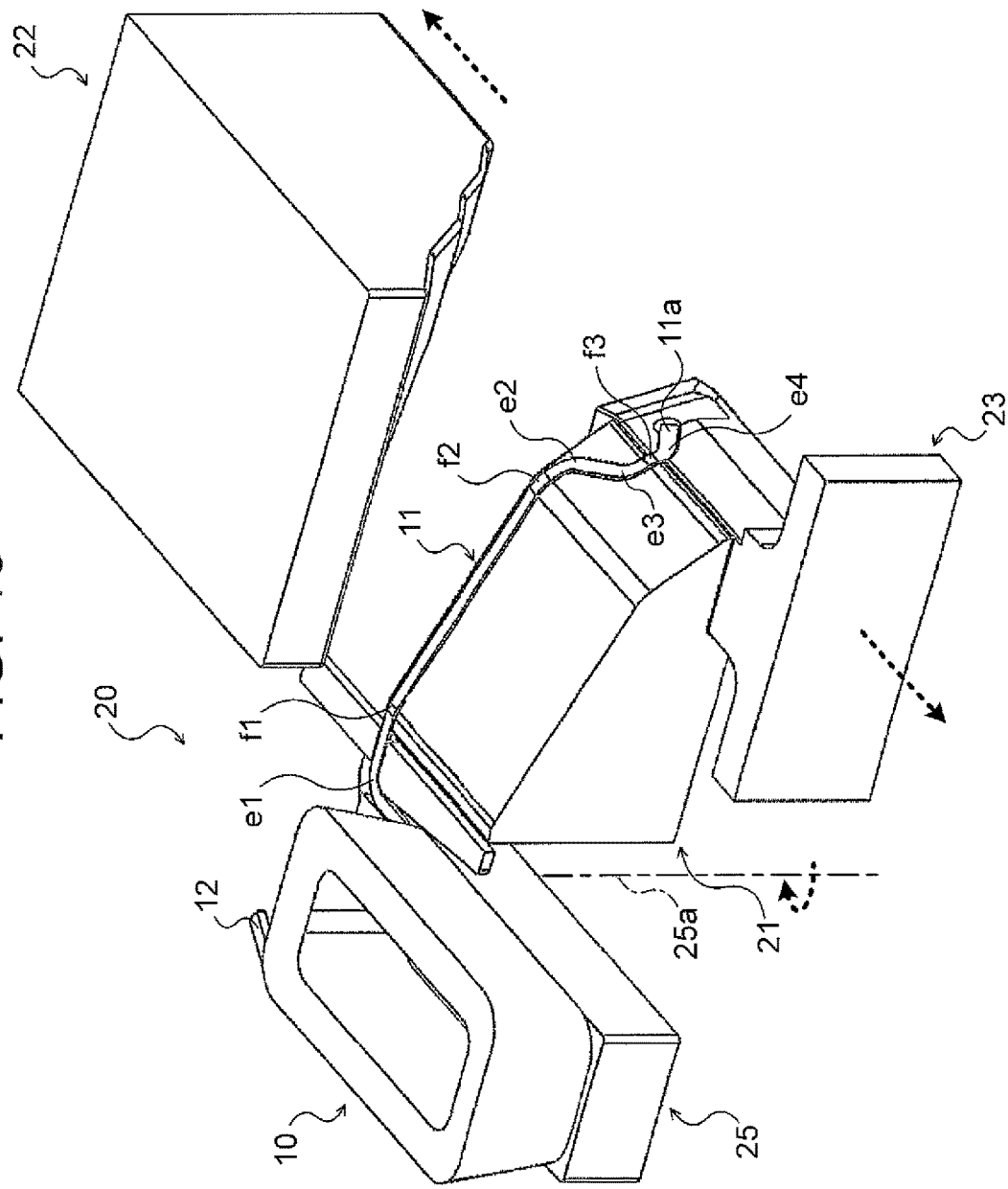
FIG. 13 is a perspective view illustrating the procedure for shaping the lead wire portion 11 used by the coil end shaping apparatus 20.

In the coil end shaping apparatus 20 according to the embodiment, in addition, the coil support portion 25 which supports the coil 10 is turned counterclockwise in the drawing about the axis of the rotary shaft 25a in conjunction with movement of the third shaping die 23 with respect to the second shaping die 22 as illustrated in FIG. 12. Thus, the edgewise bent portion e1 that is the closest to the base end side can be shaped by bending the lead wire portion 11 in the edgewise direction using the bend fulcrum portion 28 as the fulcrum through turning of the coil support portion 25 which supports the coil 10 with the free end side of the lead wire portion 11 held (restrained) by at least the first and second shaping dies 21 and 22. As a result, it is possible to shape the edgewise bent portion e1 that is the closest to the base end side while securing the precision in position of the free end portion 11a of the lead wire portion 11 with respect to the coil 10. In the embodiment, shaping of the edgewise bent portion e1 that is the closest to the base end side is completed by turning the coil support portion 25 by 90° counterclockwise from the initial position as illustrated in FIG. 12. In this way, after the plurality of edgewise bent portions e1, e2, e3, and e4 and the plurality of flatwise bent portions f1, f2, and f3 are shaped in the lead wire portion 11, the second shaping die 22 is moved away from the first shaping die 21 to be returned to the initial position as illustrated in FIG. 13, and the coil 10 is removed from the coil support portion 25. Further, the third shaping die 23 is moved away from the second shaping die 22, and the coil support portion 25 is turned to the initial position.

As has been described above, the coil end shaping apparatus 20 discussed above is configured to shape the edgewise bent portions e2 and e3 provided on the base end side with respect to the edgewise bent portion e4 that is the closest to the free end side, among the plurality of edgewise bent portions e1 to e4, by moving the first and second shaping dies 21 and 22 to approach each other, and to shape the edgewise bent portion e4 that is the closest to the free end side using the second shaping die 22 and the third shaping die 23. Thus, it is possible to shape the edgewise bent portions e2 and e3 provided on the base end side with respect to the edgewise bent portion e4 that is the closest to the free end side without restraining the free end portion 11a of the lead wire portion 11 using the first and second shaping dies 21 and 22, and to thereafter shape the edgewise bent portion e4 that is the closest to the free end side using the second shaping die 22 and the third shaping die 23. As a result, it is possible to suppress an increase in dimensional error and electric resistance by optimizing the amount of expansion of the edgewise bent portions e2 and e3 on the base end side of the lead wire portion 11, and to improve the precision in position of the free end portion 11a of the lead wire portion 11 with respect to the coil 10. Thus, according to the coil end shaping apparatus 20, it is possible to precisely shape the plurality of edgewise bent portions e1 to e4 in the lead wire portion 11 extending from one end of the coil 10.

Further, the coil end shaping apparatus 20 described above includes the coil support portion 25 capable of supporting the coil 10 and turning so as to shape the edgewise bent portion e1 that is the closest to the base end side, among the plurality of edgewise bent portions e1 to e4. Thus, the edgewise bent portion e1 that is the closest to the base end side can be shaped by turning the coil 10 with the free end side of the lead wire portion 11 held (restrained) by at least the first and second shaping dies 21 and 22. Thus, it is possible to shape the edgewise bent portion e1 that is the closest to the base end side while securing the precision in position of the free end portion 11a of the lead wire portion 11 with respect to the coil 10.

In addition, the coil end shaping apparatus 20 described above is configured to be able to shape the plurality of flatwise bent portions f1 to f3 bent in the flatwise direction in the lead wire portion 11. That is, the first and second shaping dies 21 and 22 of the coil end shaping apparatus 20 are capable of cooperating with each other to shape the plurality of flatwise bent portions f1 to f3. Thus, the plurality of edgewise bent portions e1 to e4 and the plurality of flatwise bent portions f1 to f3 can be shaped in the lead wire portion 11 by moving the first and second shaping dies 21 and 22 to approach each other. Thus, it is possible to further shorten the time required to shape the plurality of edgewise bent portions e1 to e4 and the plurality of flatwise bent portions f1 to f3 in the lead wire portion 11. Further, the coil end shaping apparatus 20 described above, that is, the first and second shaping dies 21 and 22, is configured to be able to shape the plurality of flatwise bent portions f1 to f3 in the lead wire portion 11 sequentially from the base end side toward the free end side. Thus, it is possible to shape the plurality of flatwise bent portions f1 to f3 in the lead wire portion 11 while suppressing an increase in amount by which the wire material is expanded in the flatwise bent portion f1 that is the closest to the base end side and the flatwise bent portion f2 that is closer to the center.

In the coil end shaping apparatus 20 described above, in addition, the second shaping die 22 is a movable die that is movable with respect to the first shaping die 21, and has the plurality of pressing surfaces 226 to 228 which press the lead wire portion 11 against the first shaping die 21 to shape the flatwise bent portions f1 to f3, the pushing surfaces 267 and 278 formed between the plurality of pressing surfaces, and the pushing surface 280 which is continuous with the pressing surface 228. The inclination angles $\theta_{267}$, $\theta_{278}$, and $\theta_{280}$ of the pushing surfaces 267, 278, and 280 with respect to the moving direction of the second shaping die 22 are determined to be steeper than the inclination angles $\theta_{226}$, $\theta_{227}$, and $\theta_{228}$ of the pressing surfaces 226 to 228 with respect to the moving direction. In this way, it is possible to reduce the interval of shaping of the plurality of flatwise bent portions f1 to f3 and to achieve a size reduction of the second shaping die 22, which is a movable die, in the moving direction by steepening the inclination angles $\theta_{267}$, $\theta_{278}$, and $\theta_{280}$ of the pushing surfaces 267, 278, and 280, which do not directly contribute to shaping of the flatwise bent portions f1 to f3, with respect to the moving direction described above.

Figure 14:
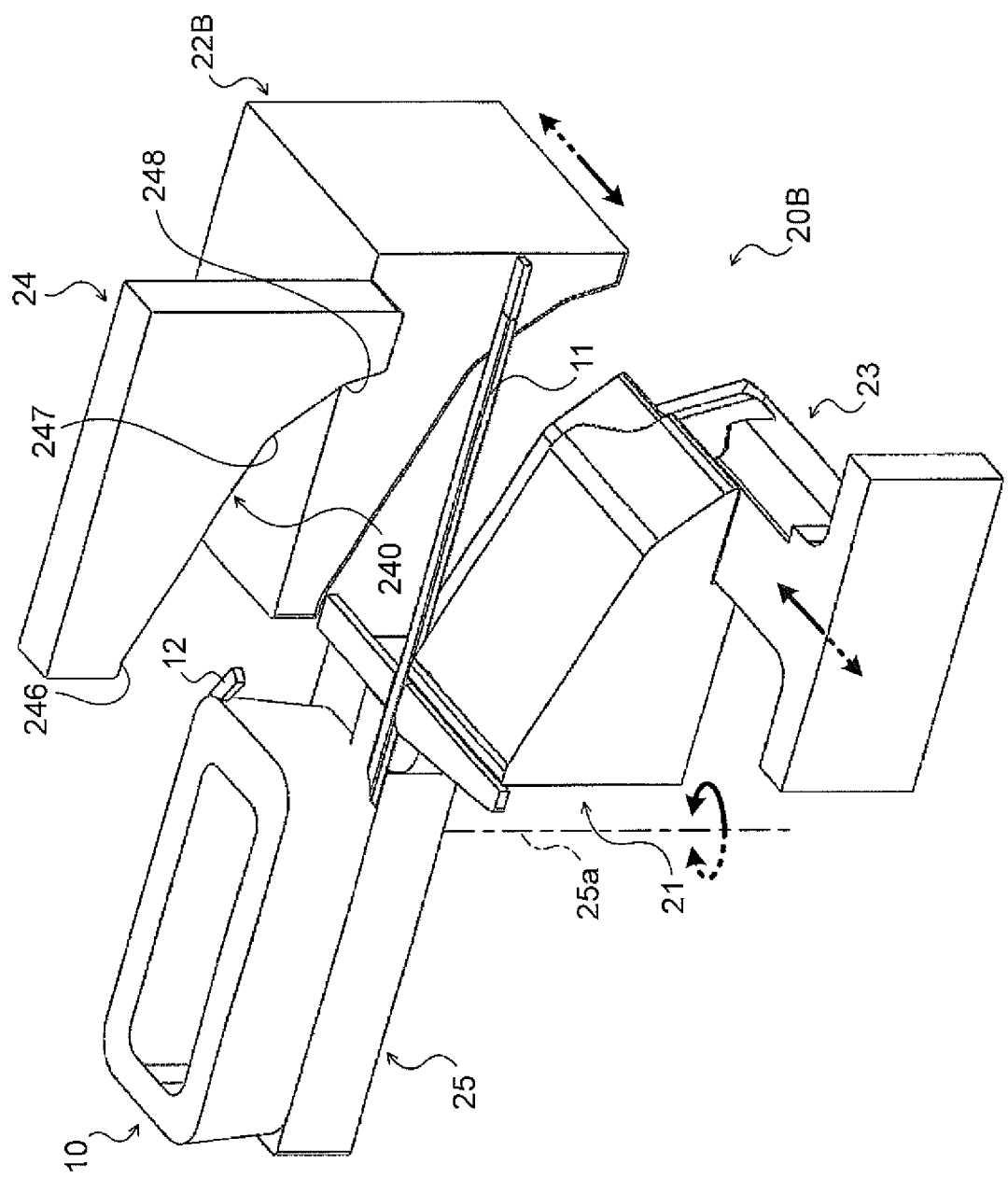
FIG. 14 is a perspective view illustrating a coil end shaping apparatus 20B according to a modification.

FIG. 14 is a perspective view illustrating a coil end shaping apparatus 20B according to a modification. Elements that are identical to the elements described in relation to the coil end shaping apparatus 20 discussed above are given the same reference numerals to omit redundant descriptions.

Figure 15:
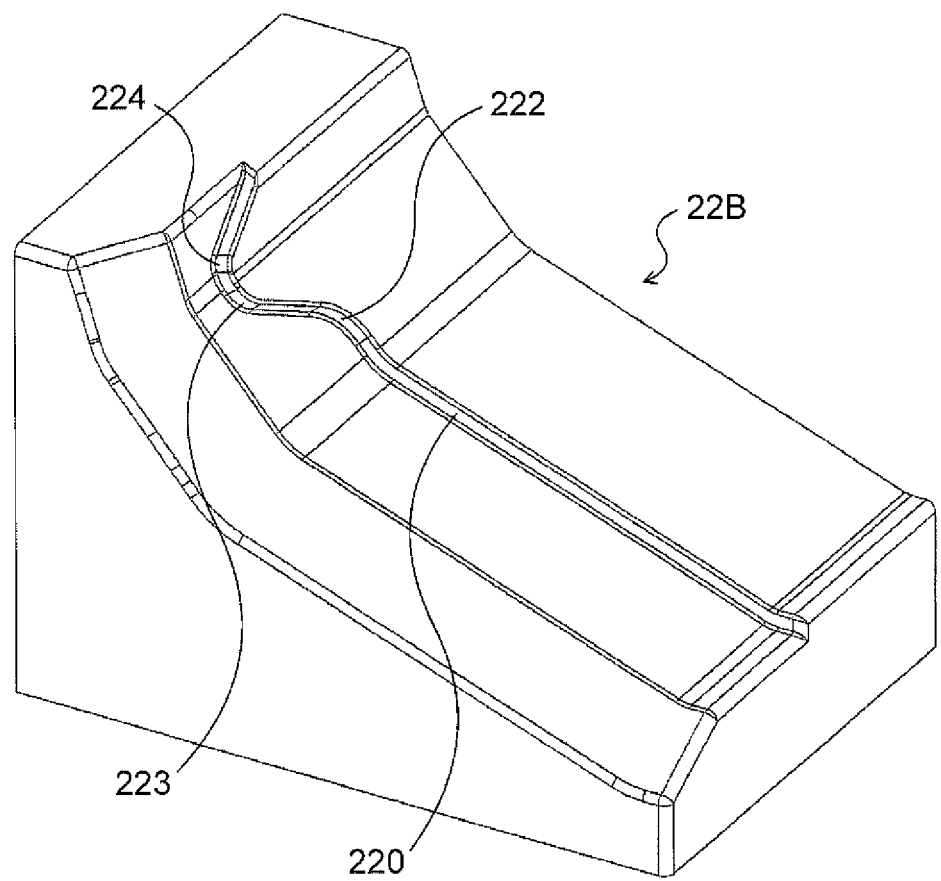
FIG. 15 is a perspective view illustrating a second shaping die 22B according to the modification.

The coil end shaping apparatus 20B illustrated in FIG. 14 is equivalent to the coil end shaping apparatus 20 discussed above in which the function of the second shaping die 22 is distributed to a fourth shaping die 24 and a second shaping die 22B. The fourth shaping die 24 of the coil end shaping apparatus 20B is a movable die driven by a drive unit (not illustrated) including an electric motor, a hydraulic cylinder, or the like to be movable toward and away from the first shaping die 21 which is a fixed die. The fourth shaping die 24 is capable of cooperating with the first shaping die 21 (first flatwise shaping surface 215) to shape the plurality of flatwise bent portions f1 to f3. As illustrated in FIG. 14, the fourth shaping die 24 has a flatwise shaping surface 240 including a curved surface 246 corresponding to the flatwise bent portion f1 of the lead wire portion 11, a curved surface 247 corresponding to the flatwise bent portion f2, and a curved surface 248 corresponding to the flatwise bent portion f3. In addition, as illustrated in FIG. 15, the second shaping die 22B is equivalent to the second shaping die 22 illustrated in FIG. 6 etc. from which the second flatwise shaping surface 225 has been omitted, and has only the second edgewise shaping surface 220 as a shaping surface.

Before shaping the lead wire portion 11 using the thus configured coil end shaping apparatus 20B, the second shaping die 22B is moved away from the first shaping die 21, the third shaping die 23 is moved away from the second shaping die 22, and the coil support portion 25 is turned in the direction of the dotted arrow in FIG. 14. Further, as illustrated in FIG. 14, the coil 10 is supported on the coil support portion 25, and the lead wire portion 11 is placed between the pair of guide members 27 of the bend guide portion 26. Then, the fourth shaping die 24 is moved by a drive unit (not illustrated) to approach the first shaping die 21, and the lead wire portion 11 is clamped between the first flatwise shaping surface 215 of the first shaping die 21 and the flatwise shaping surface 240 of the fourth shaping die 24 to shape the plurality of flatwise bent portions f1 to f3. Next, the fourth shaping die 24 is moved away from the first shaping die 21, and the second shaping die 22B is moved to approach the first shaping die 21 to shape the edgewise bent portions e2 and e3 using the first edgewise shaping surface 210 of the first shaping die 21 and the second edgewise shaping surface 220 of the second shaping die 22B. Further, the third shaping die 23 is moved to approach the second shaping die 22B to shape the edgewise bent portion e4 that is the closest to the free end side using the second edgewise shaping surface 220 of the second shaping die 22B and the third edgewise shaping surface 230 of the third shaping die 23, and the coil support portion 25 is turned to shape the edgewise bent portion e1 that is the closest to the base end side. In this way, the function of the second shaping die 22 of the coil end shaping apparatus 20 described above may be distributed to the fourth shaping die 24 and the second shaping die 22B, and it is also possible to precisely shape the plurality of edgewise bent portions e1 to e4 and the plurality of flatwise bent portions f1 to f3 in the lead wire portion 11 extending from one end of the coil 10 with the coil end shaping apparatus 20B discussed above.

Figure 16:
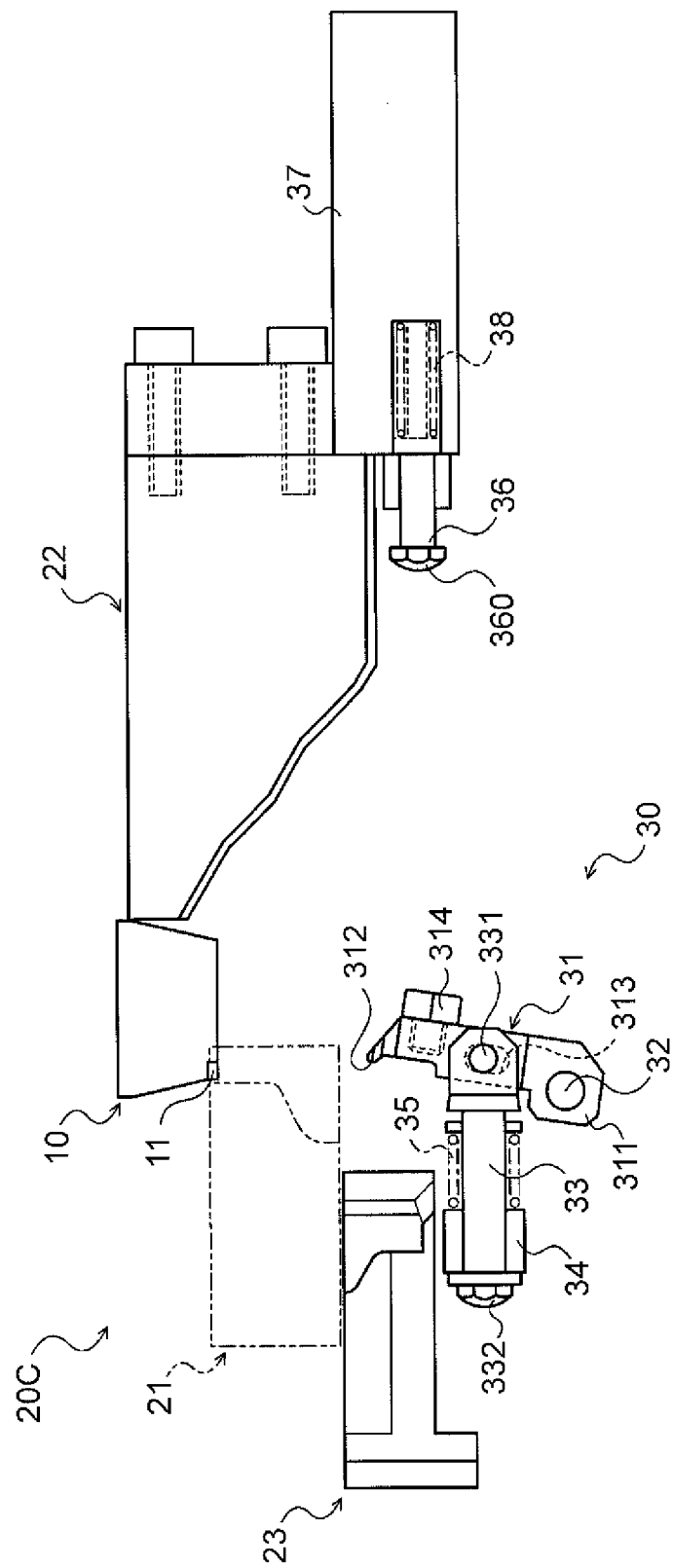
FIG. 16 illustrates a schematic configuration of a coil end shaping apparatus 20C according to another modification.

FIG. 16 illustrates a schematic configuration of a coil end shaping apparatus 20C according to another modification. Elements that are identical to the elements described in relation to the coil end shaping apparatus 20 etc. discussed above are given the same reference numerals to omit redundant descriptions.

The coil end shaping apparatus 20C illustrated in FIG. 16 is equivalent to the coil end shaping apparatus 20 discussed above to which a pushing mechanism 30 has been added, the pushing mechanism 30 being configured to push the lead wire portion 11 of the coil 10 against the first shaping die 21 when the second shaping die 22 is moved away from the first shaping die 21 which is a fixed die after shaping of the lead wire portion 11 is completed. As illustrated in the drawing, the pushing mechanism 30 includes a pushing member 31 turnably supported by a base portion to which the first shaping die 21 which is a fixed die is fixed and capable of abutting with the lead wire portion 11, a restraint rod (restraint member) 33 supported by the base portion so as to be movable in the axial direction and capable of restraining turning of the pushing member 31 with respect to the base portion, and a pressing rod (pressing member) 36 that is movable together with the second shaping die 22 which is a movable die.

The pushing member 31 of the pushing mechanism 30 has a base end portion 311, a lead wire pushing portion 312 formed at a free end portion opposite to the base end portion 311, a long hole 313 formed between the base end portion 311 and the lead wire pushing portion 312, and a pressed portion 314 disposed on the back surface on the second shaping die 22 side and positioned in the vicinity of the lead wire pushing portion 312. The base end portion 311 of the pushing member 31 is fitted with a support shaft 32 supported by the base portion described above and extending in the direction orthogonal to the moving direction of the second shaping die 22 (the direction penetrating the sheet of FIG. 16), which enables the pushing member 31 to turn about the support shaft 32.

The restraint rod 33 of the pushing mechanism 30 is supported by a rod support member 34 fixed to the base portion described above so as to be movable along the moving direction of the second shaping die 22. One end portion (the right end portion in FIG. 16) of the restraint rod 33 on the second shaping die 22 side holds a coupling pin 331 extending in parallel with the support shaft 32 described above and inserted into the long hole 313 of the pushing member 31. Further, a stopper 332 capable of abutting with the rod support member 34 is attached to the other end portion (the left end portion in FIG. 16) of the restraint rod 33. A first spring (compression spring) 35 that urges the restraint rod 33 from the first shaping die 21 toward the second shaping die 22 (rightward in the drawing) is disposed between an engagement portion formed on the outer peripheral surface of the restraint rod 33 and positioned on the coupling pin 331 side and the rod support member 34.

Thus, in an attached state (with no external force applied), the restraint rod 33 is maintained by the urging force of the first spring 35 in a state which the stopper 332 abuts with the rod support member 34 (the left end surface in FIG. 16). When the restraint rod 33 is in the attached state, the pushing member 31 is pressed by the coupling pin 331 of the restraint rod 33 to be maintained in a state (initial position) in which the lead wire pushing portion 312 is turned by a predetermined angle clockwise in FIG. 16 about the support shaft 32.

The pressing rod 36 of the pushing mechanism 30 is supported by a support block 37 fixed to the second shaping die 22 so as to face the pressed portion 314 of the pushing member 31 and be movable along the moving direction of the second shaping die 22. In addition, a pressing portion 360 capable of abutting with the pressed portion 314 of the pushing member 31 is provided at the distal end portion (left end portion in FIG. 16) of the pressing rod 36. Further, a second spring (compression spring) 38 that urges the pressing rod 36 from the second shaping die 22 toward the first shaping die 21 (leftward in the drawing) is disposed between the base end portion (right end portion in FIG. 16) of the pressing rod 36 and the support block 37. The rigidity (spring constant) of the second spring 38 which urges the pressing rod 36 is determined to be higher than the rigidity (spring constant) of the first spring 35 which urges the restraint rod 33.

Subsequently, operation of the pushing mechanism 30 of the coil end shaping apparatus 20C will be described with reference to FIGS. 17 to 23.

Figure 17:
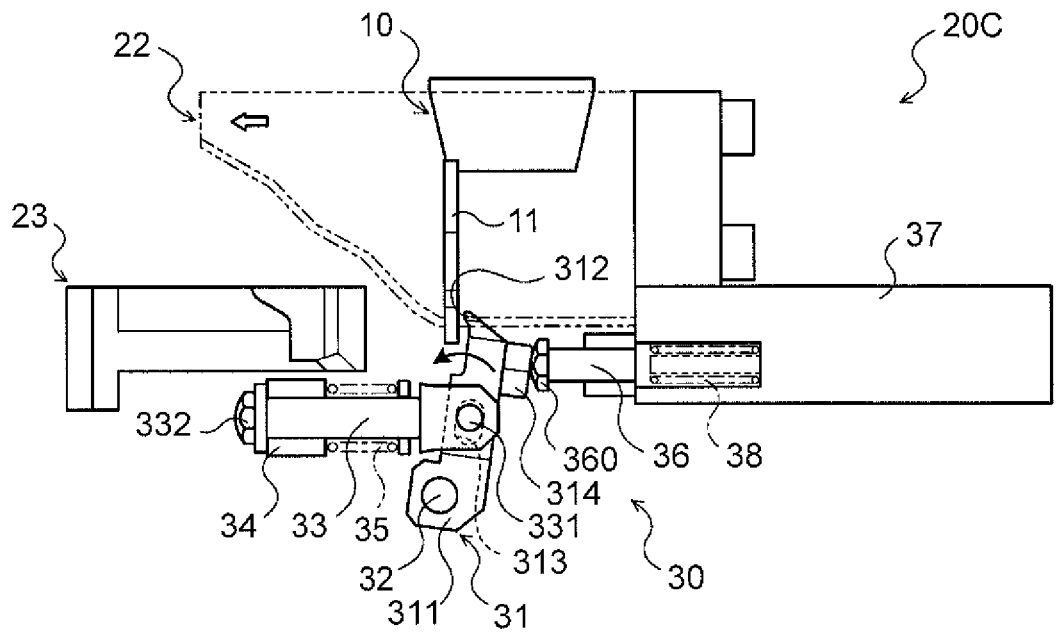
FIG. 17 is a schematic configuration diagram illustrating operation of a pushing mechanism 30 of the coil end shaping apparatus 20C.

In shaping the lead wire portion 11 using the coil end shaping apparatus 20C, as the second shaping die 22 is moved toward the first shaping die 21, the pressing portion 360 of the pressing rod 36 which moves together with the second shaping die 22 abuts with the pressed portion 314 of the pushing member 31 as illustrated in FIG. 17 when the first shaping die 21 and the second shaping die 22 are brought into proximity to each other (for example, when the flatwise bent portions f1 to f3 are shaped). Thus, the pressed portion 314 is pressed by the pressing rod 36 as the second shaping die 22 is further moved toward the first shaping die 21. In this event, since the rigidity (spring constant) of the second spring 38 which urges the pressing rod 36 is higher than the rigidity (spring constant) of the first spring 35 which urges the restraint rod 33, the second spring 38 is not contracted. As the pressed portion 314 is pressed by the pressing rod 36, the restraint rod 33 is moved leftward in the drawing to compress the first spring 35, which turns the pushing member 31 counterclockwise in the drawing about the support shaft 32.

Figure 18:
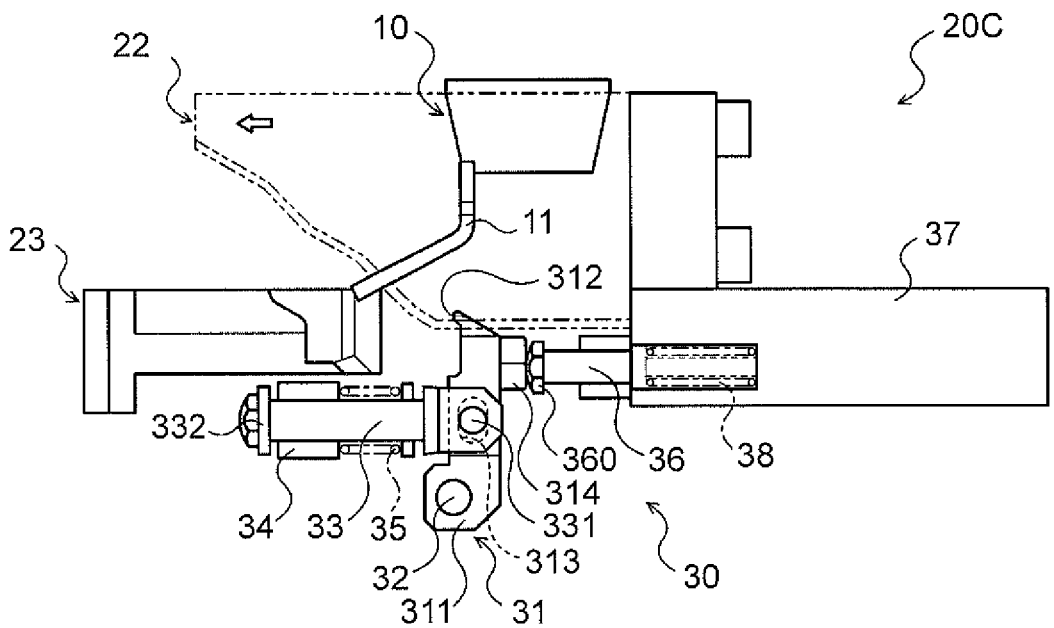
FIG. 18 is a schematic configuration diagram illustrating operation of the pushing mechanism 30 of the coil end shaping apparatus 20C.
Figure 19:
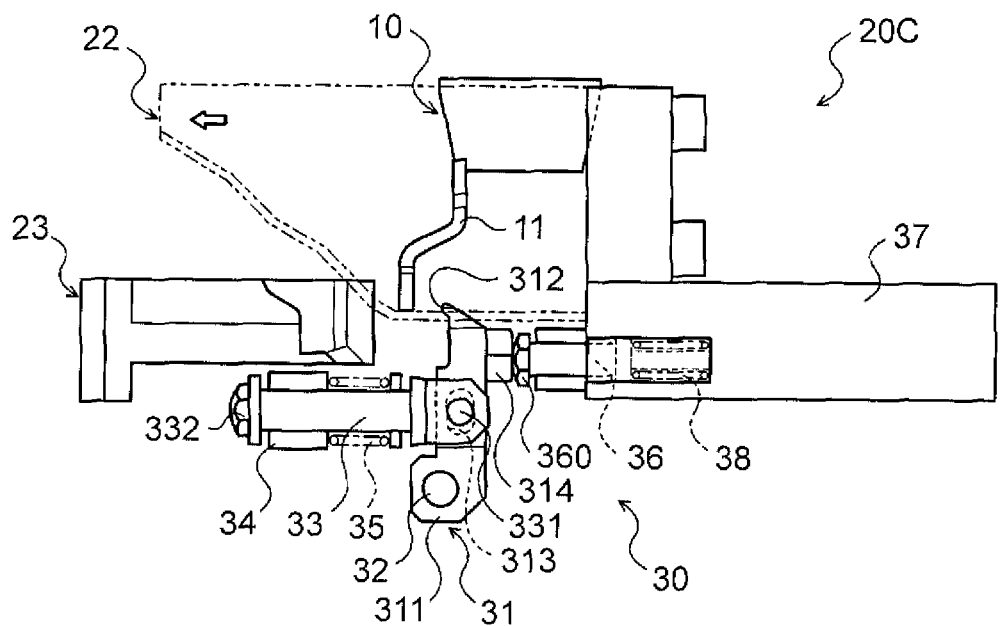
FIG. 19 is a schematic configuration diagram illustrating operation of the pushing mechanism 30 of the coil end shaping apparatus 20C.
Figure 20:
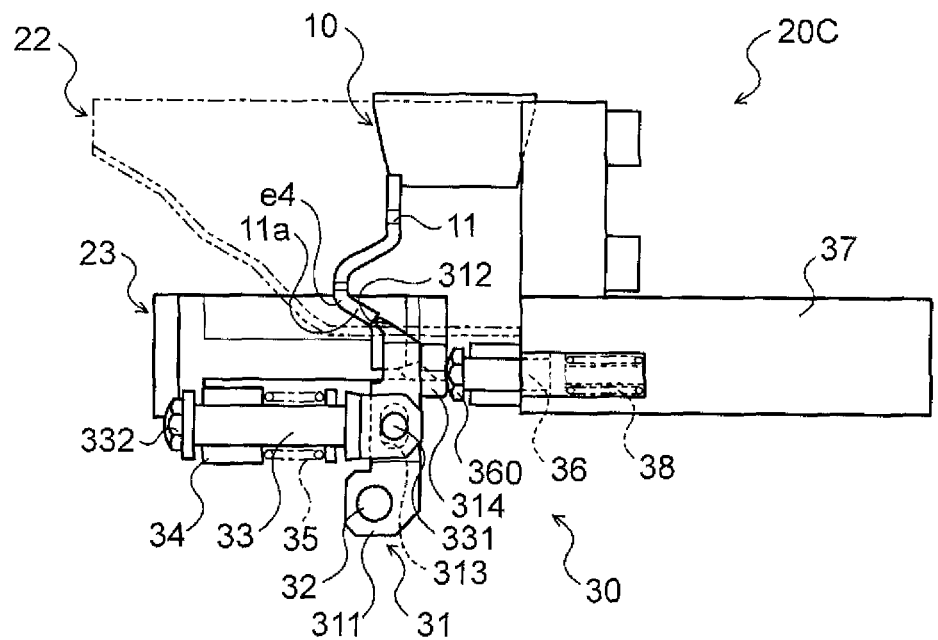
FIG. 20 is a schematic configuration diagram illustrating operation of the pushing mechanism 30 of the coil end shaping apparatus 20C.
Figure 21:
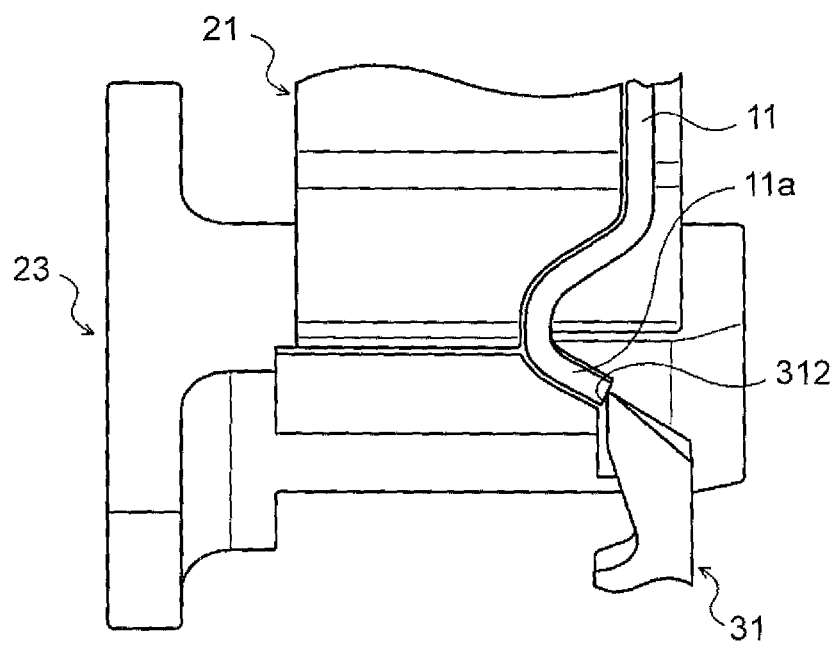
FIG. 21 is a perspective view illustrating operation of the pushing mechanism 30 of the coil end shaping apparatus 20C.

In the coil end shaping apparatus 20C, in addition, the first spring 35 is completely contracted when the pressed portion 314 is pressed by the pressing rod 36 to become upright as illustrated in FIG. 18 (extend along the up-down direction in the drawing). Thus, even if the second shaping die 22 is further moved toward the first shaping die 21 after that so that the pressed portion 314 is pressed by the pressing rod 36, turning of the pushing member 31 is restrained as illustrated in FIG. 19, and the pushing member 31 is stopped at an abutment position illustrated in FIGS. 18 and 19. Further, after the first spring 35 is completely contracted, the pressing rod 36 moves with respect to the support block 37 as the second shaping die 22 is further moved toward the first shaping die 21, and the second spring 38 is compressed from the natural length as illustrated in FIG. 19. Then, in the coil end shaping apparatus 20C, when the edgewise bent portion e4 that is the closest to the free end side is shaped by the second shaping die 22 and the third shaping die 23 after movement of the second shaping die 22 with respect to the first shaping die 21 is stopped, the lead wire pushing portion 312 of the pushing member 31, which has been prevented from turning by contraction of the first spring 35 and stopped at the abutment position as discussed above, abuts with the end surface (cut end surface) of the free end portion 11a of the lead wire portion 11 as illustrated in FIGS. 20 and 21.

Also in the coil end shaping apparatus 20C, the second shaping die 22 is moved away from the first shaping die 21 after the edgewise bent portion e4 that is the closest to the free end side (and the edgewise bent portion e1 that is the closest to the base end side) is shaped in the lead wire portion 11 by the second shaping die 22 and the third shaping die 23. Here, as discussed above, the second spring 38 is compressed with the pressing rod 36 moved with respect to the support block 37 until the second shaping die 22 is further moved toward the first shaping die 21 and stopped after the first spring 35 is completely contracted, and the second spring 38 is maintained in a compressed state while the second shaping die 22 is stopped.

Figure 22:
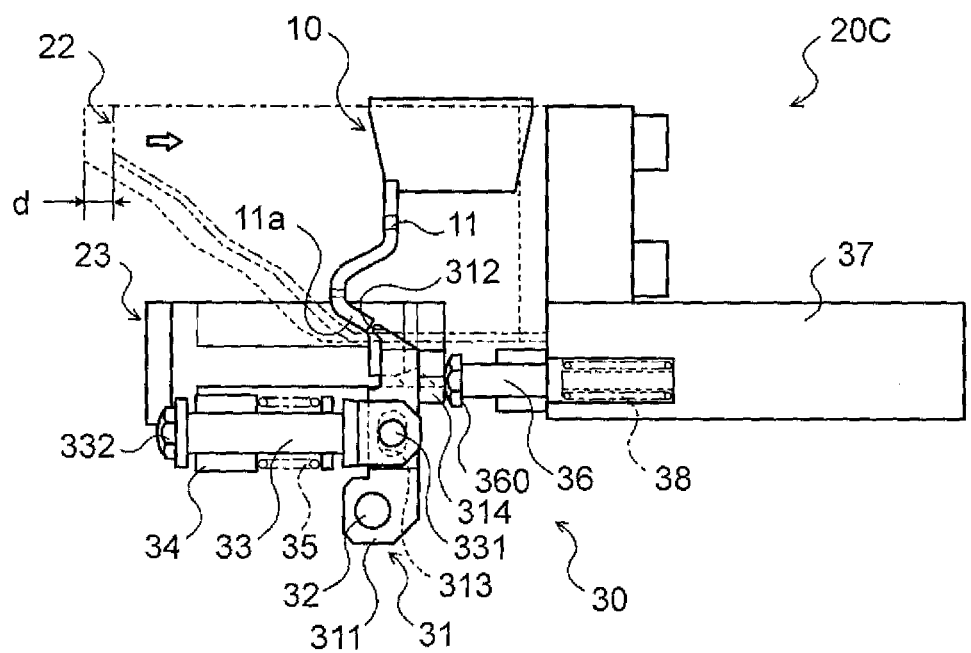
FIG. 22 is a schematic configuration diagram illustrating operation of the pushing mechanism 30 of the coil end shaping apparatus 20C.

Thus, as the second shaping die 22 is moved away from the first shaping die 21 after shaping of the edgewise bent portion e4 that is the closest to the free end side is completed, the second spring 38 which has been compressed is expanded, and the pressed portion 314 of the pushing member 31 is pressed by the urging force of the second spring 38 via the pressing rod 36 until the second spring 38 restores the natural length. Thus, as illustrated in FIG. 22, the pushing member 31 is kept at the abutment position discussed above by the urging force of the second spring 38 until the second shaping die 22 is moved away from the first shaping die 21 (not illustrated in FIG. 22) by a predetermined amount d and the second spring 38 restores the natural length. Thus, the lead wire pushing portion 312 and the end surface of the free end portion 11a of the lead wire portion 11 are maintained in abutment with each other, and the lead wire portion 11 is pushed against the first shaping die 21 by the pushing member 31.

As a result, in the coil end shaping apparatus 20C, it is possible to favorably suppress deformation of the lead wire portion 11 due to being dragged (pulled) by the moving second shaping die 22 because of a friction force generated between the lead wire portion 11 (in particular, a portion swelled during shaping) and the shaping surface of the second shaping die when the second shaping die 22 is moved away from the first shaping die 21 after shaping of the lead wire portion 11 is completed. In addition, it is possible to favorably suppress damage caused to an insulating layer formed on the outer peripheral surface of the lead wire portion 11 when the pushing member 31 pushes the lead wire portion 11 against the first shaping die 21 by bringing the lead wire pushing portion 312 of the pushing member 31 and the end surface of the free end portion 11a of the lead wire portion 11 into abutment with each other as discussed above.

Figure 23:
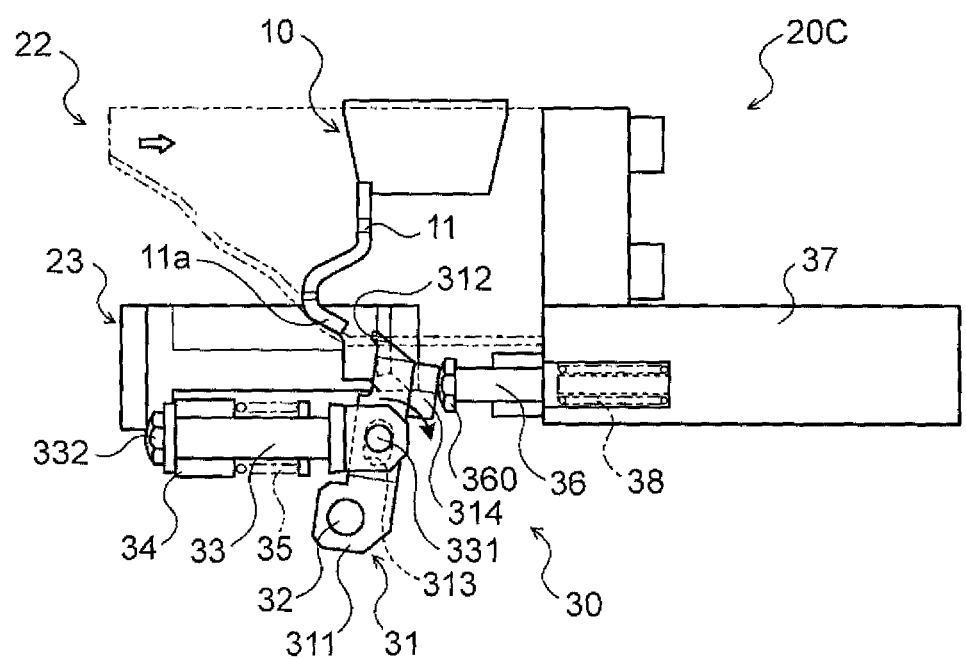
FIG. 23 is a perspective view illustrating operation of the pushing mechanism 30 of the coil end shaping apparatus 20C.

Then, when the second shaping die 22 is further moved away from the first shaping die 21 after the second shaping die 22 is moved away from the first shaping die 21 by the predetermined amount d and the second spring 38 restores the natural length, the restraint rod 33 is moved rightward in the drawing by the urging force of the first spring 35 as illustrated in FIG. 23, which turns the pushing member 31 clockwise in the drawing about the support shaft 32. As a result, the lead wire pushing portion 312 and the end surface of the free end portion 11a of the lead wire portion 11 are brought out of abutment with each other as the second shaping die 22 is moved away from the first shaping die 21, which returns the pushing member 31 to the initial position. Also in the coil end shaping apparatus 20C, the coil 10 is removed from the coil support portion 25 after the second shaping die 22 is moved away from the first shaping die 21 to be returned to the initial position, the third shaping die 23 is moved away from the second shaping die 22, and the coil support portion 25 is turned to the initial position.

With the coil end shaping apparatus 20C including the pushing mechanism 30 configured as discussed above, it is possible to favorably suppress deformation of the lead wire portion 11 due to being dragged by the moving second shaping die 22 when the second shaping die 22 is moved away from the first shaping die 21 after shaping of the lead wire portion 11 is completed. The pushing mechanism 30 discussed above may be added to the coil end shaping apparatus 20B illustrated in FIG. 14.

In addition, in the pushing mechanism 30 of the coil end shaping apparatus 20C, the pushing member 31 is turned (moved) so as to abut with the free end portion 11a (end surface) of the lead wire portion 11 when the edgewise bent portion e4 that is the closest to the free end side is shaped as the second shaping die 22 is moved toward the first shaping die 21, turning (movement) of the pushing member 31 is restrained until the second shaping die 22 is moved away from the first shaping die 21 by the predetermined amount d after the edgewise bent portion e4 that is the closest to the free end side is shaped, and the pushing member 31 is turned (moved) such that the lead wire pushing portion 312 is moved away from the free end portion 11a (end surface) as the second shaping die 22 is further moved away from the first shaping die 21. Thus, the pushing member 31 can be advanced and refracted so as not to hinder shaping of the lead wire portion 11 performed by the first to third shaping dies 21 to 23 in accordance with movement of the second shaping die 22 toward and away from the first shaping die 21. In addition, turning (movement) of the pushing member 31 is restrained until the second shaping die 22 is moved away from the first shaping die 21 by the predetermined amount d, which makes it possible to further favorably suppress deformation of the lead wire portion 11 due to being dragged by the moving second shaping die 22.

In the coil end shaping apparatuses 20, 20B, and 20C described above, the first shaping die 21 may be a movable die, and the second shaping dies 22 and 22B may be a fixed die. In addition, the third shaping die 23 may cooperate with the first shaping die 21 to shape the edgewise bent portion e4. Further, a dedicated drive unit configured to turn the coil support portion 25 may be used in place of causing the coil support portion 25 to operate in conjunction with the third shaping die 23.

In addition, the coil end shaping apparatuses 20, 20B, and 20C discussed above may be configured such that the first and second shaping dies 21 and 22 shape some (at least one) of the edgewise bent portions provided on the base end side with respect to the edgewise bent portion e4 that is the closest to the free end side, and such that the second shaping die 22 and the third shaping die 23 are used to shape the edgewise bent portion e4 that is the closest to the free end side and some (at least one) of the edgewise bent portions provided on the base end side with respect to the edgewise bent portion e4.

Further, the third shaping die 23 may be omitted from the coil end shaping apparatuses 20 and 20C. That is, a coil end shaping apparatus that shapes a plurality of edgewise bent portions that are bent in the edgewise direction in a lead wire portion extending from one end of a coil may include first and second shaping dies capable of approaching each other to shape at least some of the plurality of edgewise bent portions and at least one flatwise bent portion. Thus, at least one edgewise bent portion and at least one flatwise bent portion can be shaped in the lead wire portion by moving the first and second shaping dies to approach each other. Thus, it is possible to further shorten the time required to shape the edgewise bent portion and the flatwise bent portion in the lead wire portion. Such coil end shaping apparatuses may be configured to be able to shape the plurality of flatwise bent portions in the lead wire portion sequentially from the base end side toward the free end side of the lead wire portion. Thus, it is possible to shape the plurality of flatwise bent portions in the lead wire portion while suppressing an increase in amount by which the wire material is expanded in the flatwise bent portion on the base end side of the lead wire portion.

Here, the correspondence between the main elements of the embodiment etc. described above and the main elements of exemplary embodiments described in the "SUMMARY" section will be described. That is, in the embodiment etc. described above, the coil end shaping apparatuses 20 and 20B which shape the plurality of edgewise bent portions e1 to e4 which are bent in the edgewise direction in the lead wire portion 11 extending from one end of the coil 10 correspond to the "coil end shaping apparatus". The first shaping die 21 and the second shaping dies 22 and 22B capable of approaching each other to shape the edgewise bent portions e2 and e3 provided on the base end side with respect to one of the plurality of edgewise bent portions e1 to e4 that is the closest to the free end side correspond to the "first and second shaping dies". The third shaping die 23 capable of cooperating with the second shaping dies 22 and 22B to shape the edgewise bent portion e4 that is the closest to the free end side corresponds to the "third shaping die". The fourth shaping die 24 capable of cooperating with the first shaping dies 21 to shape the flatwise bent portions f1 to f3 corresponds to the "fourth shaping die".

The correspondence between the main elements of the embodiment described above and the main elements of the exemplary embodiments described in the "SUMMARY" section does not limit the elements described in the "SUMMARY" section, because the embodiment described above is an example given for the purpose of specifically describing the invention described in the "SUMMARY" section. That is, the embodiment described above is merely a specific example of the invention described in the "SUMMARY" section, and the invention described in the "SUMMARY" section should be construed on the basis of the description in that section.

While a mode has been described above, it is a matter of course that the present invention is not limited to the embodiment described above in any way, and that the present invention may be modified in various ways without departing from the scope and sprit of the present invention.

INDUSTRIAL APPLICABILITY

The present invention can be utilized in the industry for the manufacture of coils including a lead wire portion having a plurality of edgewise bent portions at one end.

The invention claimed is:

1. A coil end shaping apparatus that shapes a plurality of edgewise bent portions that are bent in an edgewise direction in a lead wire portion extending from one end of a coil, the lead wire portion having a rectangular cross-sectional shape, the edgewise direction being a direction parallel to one side of the rectangular cross-sectional shape, a flatwise direction being a direction parallel to another side of the rectangular cross-sectional shape that is perpendicular to the edgewise direction, the apparatus comprising:
    first and second shaping dies capable of approaching each other to press the lead wire portion between the first and second shaping dies to shape at least some of the plurality of edgewise bent portions provided on a base end side of the lead wire portion with respect to one of the edgewise bent portions that is closest to a free end side of the lead wire portion;
    a third shaping die capable of cooperating with one of the first and second shaping dies to shape at least one of the plurality of edgewise bent portions that is closest to the free end side; and
    a pushing mechanism that:
    includes a pushing member configured to abut with the lead wire portion, and move the pushing member so as to abut with a free end portion of the lead wire portion when the edgewise bent portion that is closest to the free end side is shaped as one of the first and second shaping dies is moved toward the other;
    is configured to restrain movement of the pushing member when in abutment with the free end portion to restrain the free end portion until the one of the first and second shaping dies is moved away from the other by a predetermined amount after the edgewise bent portion that is closest to the free end side is shaped; and
    is configured to move the pushing member away from the free end portion of the lead wire portion as the one of the first and second shaping dies is further moved away from the other.

2. The coil end shaping apparatus according to claim 1, further comprising:
    a coil support portion configured to support the coil and turning so as to shape one of the plurality of edgewise bent portions that is closest to the base end side.

3. The coil end shaping apparatus according to claim 2, wherein
    the apparatus is configured to shape at least one flatwise bent portion that is bent in the flatwise direction in the lead wire portion.

4. The coil end shaping apparatus according to claim 3, wherein
    the first and second shaping dies are configured to cooperate with each other to shape the at least one flatwise bent portion.

5. The coil end shaping apparatus according to claim 1, wherein
the apparatus is configured to shape at least one flatwise bent portion that is bent in the flatwise direction in the lead wire portion.

6. The coil end shaping apparatus according to claim 5, wherein
the apparatus is configured to shape a plurality of the flatwise bent portions in the lead wire portion sequentially from the base end side toward the free end side of the lead wire portion.

7. The coil end shaping apparatus according to claim 6, wherein
the first and second shaping dies are configured to cooperate with each other to shape the plurality of the flatwise bent portions.

8. The coil end shaping apparatus according to claim 5, wherein
the first and second shaping dies are configured to cooperate with each other to shape the at least one flatwise bent portion.

9. The coil end shaping apparatus according to claim 8, wherein:
one of the first and second shaping dies is a movable die that is configured to move with respect to the other in a direction perpendicular to a direction in which the coil extends, and has a plurality of pressing surfaces that are configured to press the lead wire portion against the other of the first and second shaping dies to shape the flatwise bent portion, and a pushing surface formed between the plurality of pressing surfaces; and
an inclination angle of the pushing surface with respect to the moving direction of the one of the first and second shaping dies on a plane surface that is perpendicular to the direction in which the coil extends is steeper than an inclination angle of the pressing surfaces with respect to the moving direction.

10. The coil end shaping apparatus according to claim 1, wherein:
the pushing mechanism is configured to push the lead wire portion when one of the first and second shaping dies is moved away from the other, the pushing mechanism pushing the lead wire portion against the other of the first and second shaping dies so as not to move to follow movement of the one of the first and second shaping dies.

11. The coil end shaping apparatus according to claim 1, wherein
the edgewise bent portion that is closest to the free end side is bent in a direction opposite to at least one of two edgewise bent portions that are closest to and on the base end side with respect to the edgewise bent portion that is closest to the free end side.

12. A coil end shaping method of shaping a plurality of edgewise bent portions that are bent in an edgewise direction in a lead wire portion extending from one end of a coil, the lead wire portion having a rectangular cross-sectional shape, the edgewise direction being a direction parallel to one side of the rectangular cross-sectional shape, a flatwise direction being a direction parallel to another side of the rectangular cross-sectional shape that is perpendicular to the edgewise direction, the method comprising:
using first and second shaping dies capable of approaching each other to press the lead wire portion between the first and second shaping dies to shape (i) at least some of the plurality of edgewise bent portions provided on a base end side of the lead wire portion with respect to one of the plurality of edgewise bent portions that is closest to a free end side of the lead wire portion, and (ii) at least one flatwise bent portion that is bent in a flatwise direction in the lead wire portion; and
shaping at least the edgewise bent portion that is closest to the free end side using one of the first and second shaping dies and a third shaping die when the first and second shaping dies are pressing the lead wire portion.

13. The coil end shaping method according to claim 12, further comprising:
after shaping at least the edgewise bent portion that is closest to the free end side, shaping one of the plurality of edgewise bent portions that is closest to the base end side by turning the coil with at least the first and second shaping dies holding the lead wire portion.

14. The coil end shaping method according to claim 12, further comprising:
shaping a plurality of the flatwise bent portions in the lead wire portion sequentially from the base end side toward the free end side of the lead wire portion.

15. The coil end shaping method according to claim 12, further comprising:
before shaping the plurality of edgewise bent portions provided on the base end side, shaping at least one flatwise bent portion that is bent in a flatwise direction in the lead wire portion.

16. The coil end shaping method according to claim 12, further comprising:
moving one of the first and second shaping dies away from the other after shaping of the lead wire portion is completed by pushing the lead wire portion against the other of the first and second shaping dies so as not to move to follow movement of the one of the first and second shaping dies.

17. The coil end shaping method according to claim 12, wherein
the edgewise bent portion that is closest to the free end side is bent in a direction opposite to at least one of two edgewise bent portions that are closest to and on the base end side with respect to the edgewise bent portion that is closest to the free end side.

18. A coil end shaping apparatus that shapes a plurality of edgewise bent portions that are bent in an edgewise direction in a lead wire portion extending from one end of a coil, the lead wire portion having a rectangular cross-sectional shape, the edgewise direction being a direction parallel to one side of the rectangular cross-sectional shape, a flatwise direction being a direction parallel to another side of the rectangular cross-sectional shape that is perpendicular to the edgewise direction, the apparatus comprising:
first and second shaping dies capable of approaching each other to press the lead wire portion between the first and second shaping dies to shape at least some of the plurality of edgewise bent portions provided on a base end side of the lead wire portion with respect to one of the edgewise bent portions that is closest to a free end side of the lead wire portion;
a third shaping die capable of cooperating with one of the first and second shaping dies to shape at least one of the plurality of edgewise bent portions that is closest to the free end side when the first and second shaping dies are pressing the lead wire portion;
wherein the apparatus is configured to shape at least one flatwise bent portion that is bent in the flatwise direction in the lead wire portion, and the first and second shaping dies are configured to approach each other to press the lead wire portion between the first and second shaping dies to shape the at least one flatwise bent portion.

* * * * *